US012781760B2

(12) United States Patent
Han et al.

(10) Patent No.: US 12,781,760 B2
(45) Date of Patent: Nov. 3, 2026

(54) FAN MODULE AND RANGE HOOD INCLUDING SAME

(71) Applicant: SAMSUNG ELECTRONICS CO., LTD., Suwon-si (KR)

(72) Inventors: Sung Han, Suwon-si (KR); Duckjin Sung, Suwon-si (KR); Jeonghoon Kang, Suwon-si (KR); Kwanwoo Hong, Suwon-si (KR); Minsung Kim, Suwon-si (KR); Seunggee Hong, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/804,386

(22) Filed: Aug. 14, 2024

(65) Prior Publication Data

US 2024/0410389 A1 Dec. 12, 2024

Related U.S. Application Data

(63) Continuation of application No. PCT/KR2023/002128, filed on Feb. 14, 2023.

(51) Int. Cl.
*F04D 29/40* (2006.01)
*F04D 29/66* (2006.01)

(52) U.S. Cl.
CPC ......... *F04D 29/403* (2013.01); *F04D 29/663* (2013.01); *F05D 2210/12* (2013.01)

(58) Field of Classification Search
CPC .. F04D 29/403; F04D 29/4226; F04D 29/626; F04D 29/668
See application file for complete search history.

(56) References Cited

U.S. PATENT DOCUMENTS 6,398,582 B1 6/2002 Matsuyama et al.
2015/0023779 A1 1/2015 Li et al.

FOREIGN PATENT DOCUMENTS

CN 205878284 U 1/2017
CN 104467261 B 8/2017
(Continued)

OTHER PUBLICATIONS

International Search Report issued in International Application No. PCT/KR2023/002128 dated May 24, 2023.
(Continued)

*Primary Examiner* — Sabbir Hasan
(74) *Attorney, Agent, or Firm* — STAAS & HALSEY LLP

(57) ABSTRACT

A fan module and a range hood including same. The range hood includes a housing having an inlet through which air flows, and a fan module arrangeable within the housing to draw in air through the inlet of the housing, wherein the fan module includes a fan configured to guide the air drawn in, a motor to provide a driving force to rotate the blowing fan, a case arrangeable adjacent to the motor, an anti-vibration member in contact with the motor to prevent vibration of the motor from being transmitted to the case while the motor provides the driving force to the fan and the case is arranged adjacent to the motor, and a fixer positioned between the anti-vibration member and at least one of the case or the motor to prevent movement between the anti-vibration member and at least one of the case or the motor.

14 Claims, 24 Drawing Sheets

(56) References Cited

FOREIGN PATENT DOCUMENTS

| | | | | |
|---|---|---|---|---|
| CN | 208475417 | U | * | 2/2019 |
| CN | 109854519 | | | 6/2019 |
| CN | 111456946 | A | | 7/2020 |
| CN | 216199293 | U | * | 4/2022 |
| JP | 2003-23750 | | | 1/2003 |
| JP | 3476697 | | | 12/2003 |
| JP | 2012-184916 | | | 9/2012 |
| JP | 6463484 | | | 2/2019 |
| JP | 2019-203432 | | | 11/2019 |
| JP | 2020-108183 | | | 7/2020 |
| JP | 6898747 | | | 7/2021 |
| KR | 20-0138659 | | | 5/1999 |
| KR | 10-2004-0041395 | | | 5/2004 |
| KR | 10-0813328 | | | 3/2008 |
| KR | 10-2010-0112928 | | | 10/2010 |
| KR | 10-1354055 | | | 1/2014 |
| KR | 10-1407813 | | | 6/2014 |
| KR | 10-1459629 | | | 11/2014 |
| KR | 10-2016-0020889 | | | 2/2016 |
| KR | 10-1606652 | | | 3/2016 |
| KR | 10-1831059 | | | 2/2018 |
| KR | 10-1988955 | | | 6/2019 |
| KR | 10-2021-0025320 | | | 3/2021 |
| WO | WO 2019/034369 | A1 | | 2/2019 |

OTHER PUBLICATIONS

Written Opinion issued in International Application No. PCT/KR2023/002128 dated May 24, 2023.
Extended Search Report issued Mar. 20, 2025 for Application No. 23760314.7.
Korean Office Action issued Jul. 3, 2026 for Application No. 10-2022-0059806.

* cited by examiner

FAN MODULE AND RANGE HOOD INCLUDING SAME

CROSS-REFERENCE TO RELATED APPLICATION

This application is a continuation application, under 35 U.S.C. § 111(a), of international application No. PCT/KR2023/002128, filed Feb. 14, 2023, which claims priority under 35 U. S. C. § 119 to Korean Patent Application No. 10-2022-0023253, filed Feb. 22, 2022 and Korean Patent Application No. 10-2022-0059806, filed May 16, 2022, the disclosures of which are incorporated herein by reference in their entireties.

BACKGROUND

Field

The disclosure relates to a fan module and a range hood including the same, and more particularly, relates to a fan module capable of reducing noise and increasing safety by improving a structure of the fan module and a range hood including the same.

Description of the Related Art

In general, a range hood is an appliance that sis placed on top of a device that heats food to draw in contaminants, such as combustion gases, fine dust, and, oil mist generated by the food when the food is heated.

The range hood includes a fan module therein to draw in the contaminants. A motor rotates to provide a driving force for a blowing fan included in the fan module to rotate. As the motor rotates, it may come into contact with a case located adjacent to the motor, causing vibration to occur.

The vibration may cause noise. For user satisfaction, it is necessary to reduce the vibration.

To be supplied with power, the motor may be connected to a power source by lead wires. If the motor rotates by itself in addition to the rotation of a rotating shaft of the motor, the lead wires may become tangled or cut, causing a safety hazard. It is therefore necessary to prevent such a situation.

SUMMARY

According to an embodiment of the present disclosure, a range hood includes a housing having an inlet through which air flows, and a fan module arrangeable within the housing to draw in air through the inlet of the housing, wherein the fan module includes a fan configured to guide the air guide the air drawn in through the inlet, a motor to provide a driving force to rotate the fan, a case arrangeable adjacent to the motor, an anti-vibration member in contact with the motor to prevent vibration of the motor from being transmitted to the case while the motor provides the driving force to the fan and the case is arranged adjacent to the motor, and a fixer positioned between the anti-vibration member and at least one of the case or the motor to prevent movement between the anti-vibration member and the at least one of the case or the motor.

The motor may rotate in a rotational direction about a rotating shaft, and the fixer may be positioned between the anti-vibration member and the case to prevent the anti-vibration member from moving relative to the rotational direction of the case and the motor.

The fixer may include a fixing protrusion formed on one of the case and the anti-vibration member and protruding toward another of one of the case and the anti-vibration member, and a fixing groove on the other of the case and the anti-vibration member and formed to correspond to the fixing protrusion.

The anti-vibration member may include a first side facing the case and a second side opposite to the first side and facing the motor, and the fixing groove may be formed on the first side.

The fixing protrusion may protrude from one surface of the case toward the anti-vibration member, extend in a radial direction with respect to the rotating shaft of the motor, and further protrude from the one surface of the case closer to the rotating shaft of the motor.

The fixing protrusion may be provided in a plurality, and the plurality of fixing protrusions may be arranged to be spaced apart in a circumferential direction around the rotating shaft.

The fixer may include a guide groove configured to be recessed from an edge of the anti-vibration member to an inner side of the anti-vibration member, and a guide protrusion configured to be inserted into the guide groove on the case so as to prevent rotation of the anti-vibration member.

The anti-vibration member may include a flat portion positioned on an edge thereof, and an inclined portion positioned on an inner side of the flat portion and inclined toward the case closer to the rotating shaft of the motor.

A surface of the anti-vibration member facing the motor may be formed to correspond to the shape of a surface of the motor facing the anti-vibration member.

The motor may include a rotating shaft and a motor housing including a motor protrusion that is positioned to correspond to the rotating shaft and protrudes toward the case, the anti-vibration member may be formed with a member shaft hole through which the rotating shaft passes, and the fixer may include an anti-rotation protrusion configured to surround the member shaft hole and protrude toward the motor protrusion to contact the motor protrusion so as to prevent relative rotation of the case with respect to the anti-vibration member on the anti-vibration member.

The case may further include a seated portion forming a seated space for accommodating at least a portion of the motor, the seated portion may include a plurality of seat posts extending toward the motor, and the fan module may further include a lead wire positioned between the plurality of seat posts to supply power to the motor.

The case may include a case body, a seated portion configured to be recessed to an inside of the case body so as to accommodate the motor, and a motor cover coupleable to the case body by a fastening member to cover the motor, wherein the anti-vibration member may include a first anti-vibration member between the seated portion and the motor, and a second anti-vibration member between the motor and the motor cover.

The first anti-vibration member of the anti-vibration member may include a stepped portion protruding toward the seated portion, the seated portion may include a stepped recess formed to correspond to the stepped portion along a direction away from the first anti-vibration member around the rotating shaft so as to guide the stepped portion.

The fixer may include an adhesive member configured to bond the case and the anti-vibration member.

The fixer may include an extension cover formed to cover at least a portion of a side surface of the motor at an edge of the anti-vibration member.

According to an embodiment of the present disclosure, a fan module includes a housing having an inlet through which air flows, and a fan module arrangeable within the housing and drawing in air through the inlet of the housing, wherein the fan module includes a fan configured to guide the air by rotating, a motor configured to rotate about a rotating shaft to provide a driving force to rotate the fan, a case including a plurality of seat posts surrounding a seated space recessed forwardly to allow the motor to be seated, a lead wire disposed between the plurality of seat posts and connected to the motor, an anti-vibration member in contact with the motor to prevent vibration of the motor from being transmitted to the case, and a fixer positioned between the anti-vibration member and at least one of the case or the motor to prevent relative movement between the anti-vibration member and at least one of the case or the motor so as to prevent the lead wire from contacting the plurality of seat posts by rotation of the motor.

The case may include a case body, a seated portion configured to be recessed to an inside of the case body so as to accommodate the motor, and a motor cover coupled to the case body by a fastening member to cover the motor, wherein the anti-vibration member may include a first anti-vibration member disposed between the seated portion and the motor, and a second anti-vibration member disposed between the motor and the motor cover, wherein the fixer may include a first fixer disposed between the first anti-vibration member and the seated portion; and a second fixer disposed between the second anti-vibration member and the motor cover.

The first fixer may include a first fixing protrusion formed on the seated portion and protruding toward the first anti-vibration member and a first fixing groove formed on the first anti-vibration member and concave in a direction away from the seated portion, and the second fixer may include a second fixing protrusion formed on the motor cover and protruding toward the second anti-vibration member and a second fixing groove formed on the second anti-vibration member and concave in a direction away from the motor cover.

According to an embodiment of the present disclosure, a fan module includes a fan configured to flow air by rotating, a motor configured to rotate about a rotating shaft in a rotational direction to provide a driving force to rotate the fan, a lead wire connected to the motor for supplying power to the motor, a case located adjacent to the motor, an anti-vibration member in contact with the motor and the case to prevent vibration of the motor from being transmitted to the case, and a fixer positioned between the anti-vibration member and the case to prevent relative movement in the rotational direction of the anti-vibration member and the case.

The fixer may include a fixing protrusion formed on one of the case and the anti-vibration member and protruding toward the other, and a fixing groove formed on the other of the case and the anti-vibration member and formed to correspond to the fixing protrusion.

DETAILED DESCRIPTION

Figure 1:
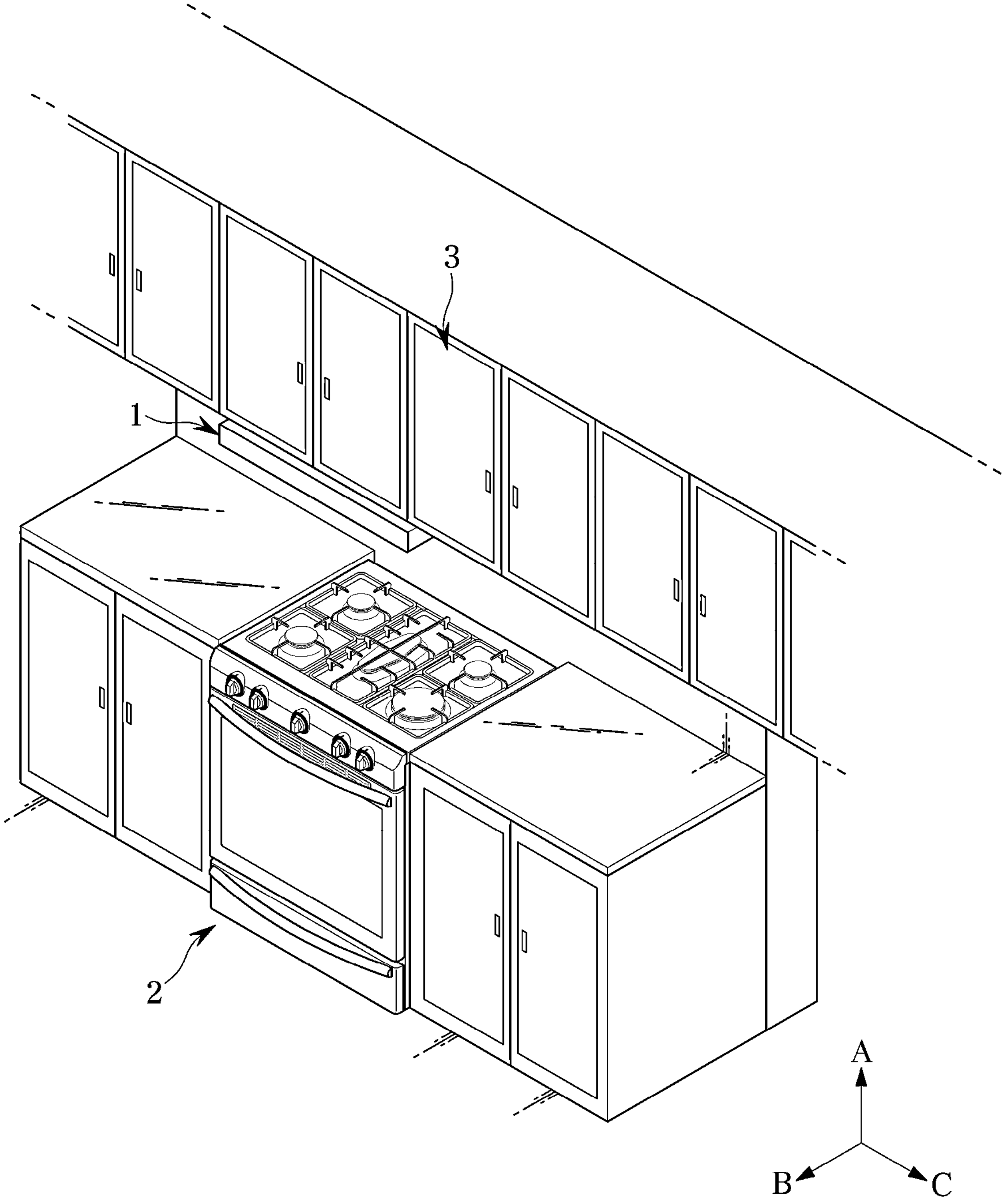
FIG. 1 is a perspective view illustrating a range hood installed according to an embodiment of the present disclosure.

Various embodiments and the terms used therein are not intended to limit the technology disclosed herein to specific forms, and the disclosure should be understood to include various modifications, equivalents, and/or alternatives to the corresponding embodiments.

In describing the drawings, similar reference numerals may be used to designate similar constituent elements.

Also, the terms used herein are used to describe the embodiments and are not intended to limit and/or restrict the disclosure. The singular forms "a," "an" and "the" are intended to include the plural forms as well, unless the context clearly indicates otherwise. In this disclosure, the terms "including", "having", and the like are used to specify features, figures, steps, operations, elements, components, or combinations thereof, but do not preclude the presence or addition of one or more of the features, figures, steps, operations, elements, components, or combinations thereof.

It will be understood that, although the terms "first", "second", "primary", "secondary", etc., may be used herein to describe various elements, but elements are not limited by these terms. These terms are only used to distinguish one element from another element. For example, without departing from the scope of the disclosure, a first element may be termed as a second element, and a second element may be termed as a first element. The term of "and/or" includes a plurality of combinations of relevant items or any one item among a plurality of relevant items.

In the following detailed description, the terms of "front", "forward", "rear", "backward", "top", "bottom", "upper", "lower", "left", and "right" may be defined by the drawings, but the shape and the location of the component is not limited by the term.

One aspect of the present disclosure provides a fan module capable of generating less noise and a range hood including the same.

Further, one aspect of the present disclosure provides a fan module having a motor that is prevented from rotating, thereby increasing reliability, and a range hood including the same.

According to various embodiments of the present disclosure, the noise generated between the motor and the case may be reduced by having an anti-vibration member positioned between the motor and the case.

Further, according to various embodiments of the present disclosure, the motor may be prevented from rotating by providing the fixer capable of fixing the anti-vibration member and at least one of the motor or the case.

Specifically, as shown in FIG. 1, a direction from which a cooking appliance 2 is facing may be defined as front, and rear, left and right sides, and up and down sides may be defined based thereon.

Hereinafter, various embodiments according to the disclosure will be described in detail with reference to the accompanying drawings.

FIG. 1 is a perspective view showing a range hood 1 installed according to an embodiment of the present disclosure.

As shown in FIG. 1, the cooking appliance 2 according to an embodiment of the present disclosure may be placed indoors. For example, the cooking appliance 2 may be placed in a kitchen. The cooking appliance 2 may be coupled to a storage cabinet 3.

The cooking appliance 2 may include a heating device for heating food. The heating device may be formed as an oven, a gas range, an induction stove, or the like. In particular, the heating device may include a cooktop unit may be arranged such that food is placed on top of the heating device and the food is cooked.

The range hood 1 may draw in exhaust gases, smoke, food odors generated by the heating device, and the like, and discharge them to outdoors.

However, in an embodiment of the present disclosure, the range hood 1 may be defined as a configuration independent of the cooking appliance 2. However, the present disclosure is not limited thereto and the range hood 1 may be defined as a configuration integrally arranged with the cooking appliance 2.

The range hood 1 may not be limited to an embodiment of the present disclosure and may be provided to be combined with the cooking appliance 2 unit, such as an over the range (OTR) unit.

The range hood 1 may be placed in the storage cabinet 3 provided on an upper side. The heating device of the cooking appliance 2 may be spaced apart from the range hood 1 by a predetermined distance in a vertical direction, and may be installed on a lower side of the range hood 1. The heating device may be placed in the storage cabinet 3 provided on a lower side.

In other words, the range hood 1 may be placed above the cooking appliance 2 in the vertical direction. As a result, exhaust gases, smoke, food odor and the like generated by the cooking appliance 2 may be drawn in upward and discharged to outdoors.

Although an example of the cooking appliance 2 being installed indoors is described, a method of installing the cooking appliance 2 is not limited thereto and may be installed in various ways depending on the size and characteristics of the installation site, installation purpose, and the like.

Figure 2:
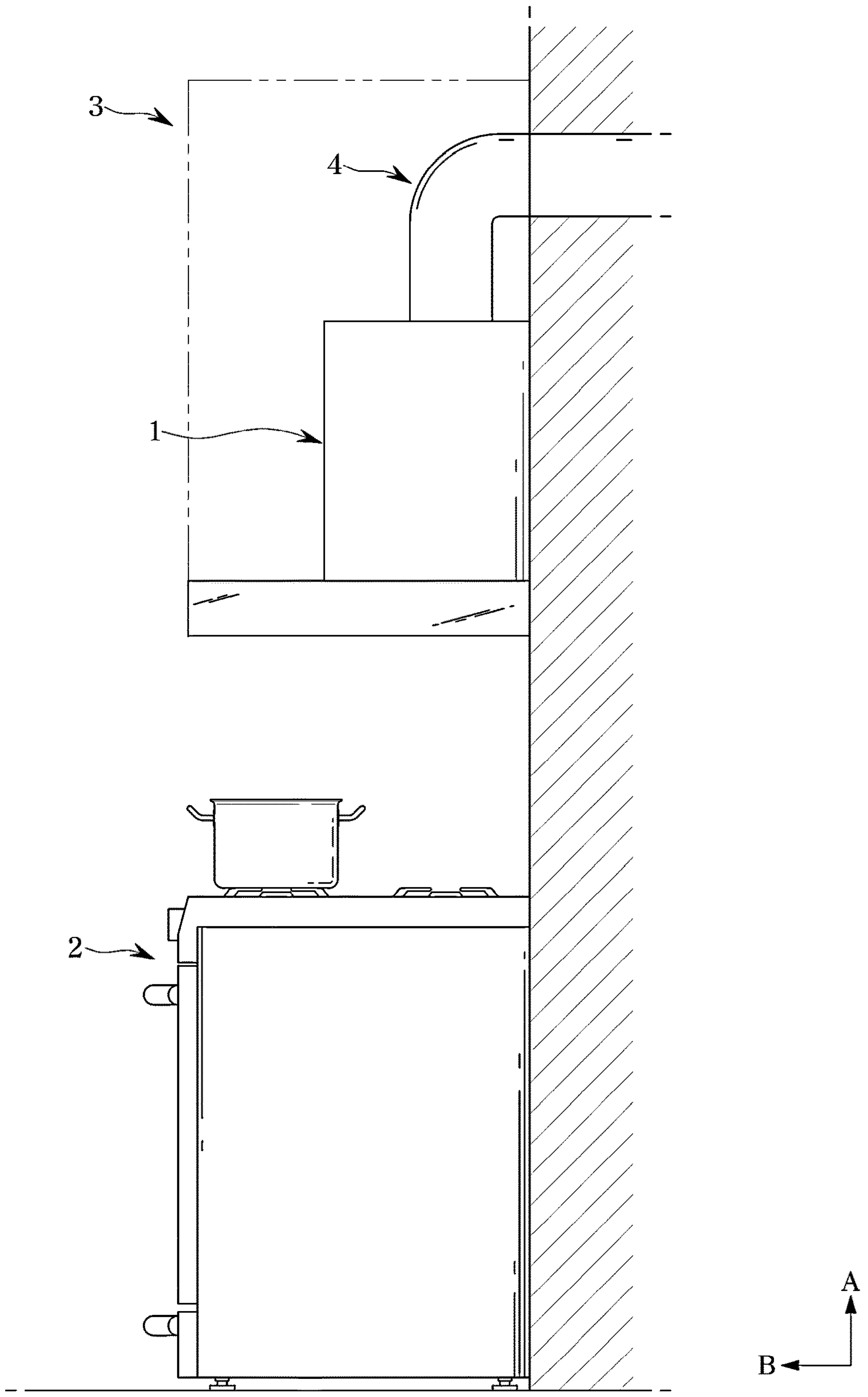
FIG. 2 is a side view of FIG. 1 viewed from the side according to an embodiment of the present disclosure.

FIG. 2 is a side view of FIG. 1 viewed from the side.

As shown in FIG. 2, the range hood 1 and a duct 4 may be installed on an inner side of the storage cabinet 3. The duct 4 may be connected to one side of the range hood 1. Contaminants generated by the cooking appliance 2 may be drawn into the interior of the range hood 1 and be discharged to the outdoors through the duct 4.

Figure 3:
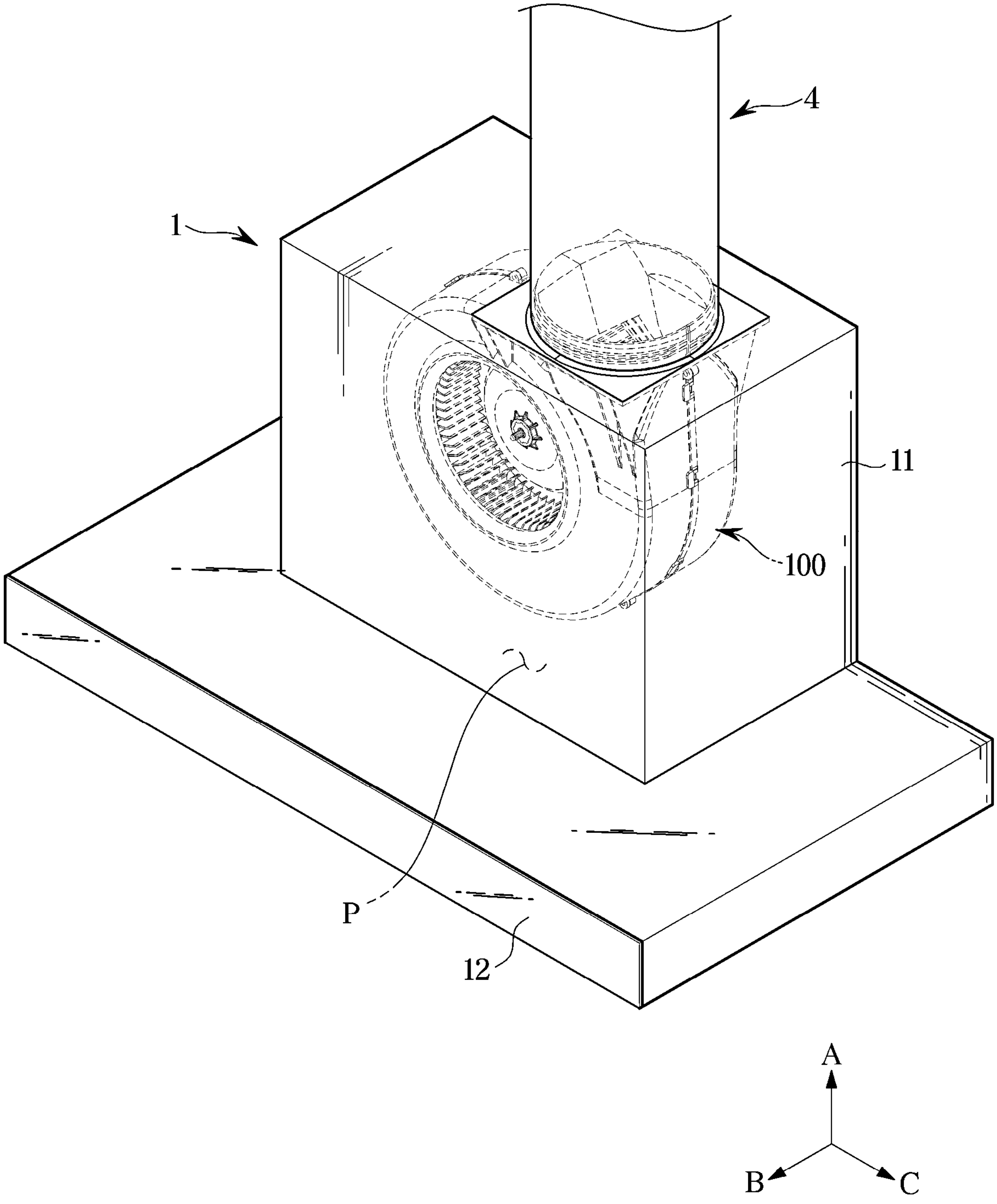
FIG. 3 is a perspective view illustrating the range hood of FIG. 1 and a duct according to an embodiment of the present disclosure.

FIG. 3 is a perspective view showing the range hood 1 of FIG. 1 and the duct 4.

As shown in FIG. 3, the range hood 1 may include a housing 10 forming an exterior thereof.

The housing 10 may include an upper housing 11 provided on an upper side and a lower housing 12 provided on a lower side.

The lower housing 12 may include an inlet 20 through which smoke or the like generated by the cooking appliance 2 flows. The inlet 20 may be provided on a lower surface of the lower housing 12. The inlet 20 may be provided with a filter (not shown) corresponding to the inlet 20. The filter may be mounted on the lower housing 12 to cover the inlet 20. The filter may be configured to filter out foreign substances, such as smoke, introduced into the inlet 20.

The lower housing 12 may be provided in a substantially cuboidal shape. A discharge flow path P may be formed within the lower housing 12. The discharge flow path P may be provided to guide air passing through the filter and the inlet 20 to pass through the upper housing 11 to the outside.

The discharge flow path P may refer to a space inside the housing 10, or alternatively, to a separately partitioned space inside the housing 10 or the duct 4 installed in the housing 10.

The upper housing 11 may be disposed on the upper side of the lower housing 12. A fan module 100 may be disposed within the upper housing 11. The upper housing 11, as the lower housing 12, may be provided in a substantially cuboidal shape. The upper housing 11 may have a smaller lower and upper surface area and a greater height than the lower housing 12. The upper housing 11 may be provided separately from the lower housing 12 and coupled to each other, or alternatively, the upper housing 11 and the lower housing 12 may be provided integrally. Furthermore, the upper housing 11 may be formed integrally with the lower housing 12 by having an upper surface of the lower housing 12 extending upwardly at an angle with respect to the vertical direction.

The discharge flow path P may be formed inside the upper housing 11. The discharge flow path P may be connected to the discharge flow path P of the lower housing 12. Air introduced through the inlet 20 may pass through a flow path of the lower housing 12 and a flow path of the upper housing 11 and may be discharged to the outside through the duct 4. The fan module 100 may be provided within the discharge flow path P. The discharge flow path P may refer to an internal space of the upper housing 11, or alternatively, to a separately partitioned space inside the upper housing 11 or the duct 4 installed inside the upper housing 11.

The fan module 100 may be disposed within the upper housing 11. In addition, the fan module 100 may be arranged such that a rotation axis of a blowing fan 110, which will be described later, extends in a front-to-back direction. This arrangement of the fan module 100 may allow air to be drawn into a front side of the fan module 100 and discharged upwardly. The fan module 100 may be connected to the duct 4 to discharge air to the outside.

For ease of description, the present disclosure will be described based on the fan module 100 being disposed on an inner side of the upper housing 11. However, the present disclosure is not limited thereto and the fan module 100 may be disposed on an inner side of the lower housing 12.

Hereinafter, an air flow inside the housing 10 will be described in detail.

Figure 4:
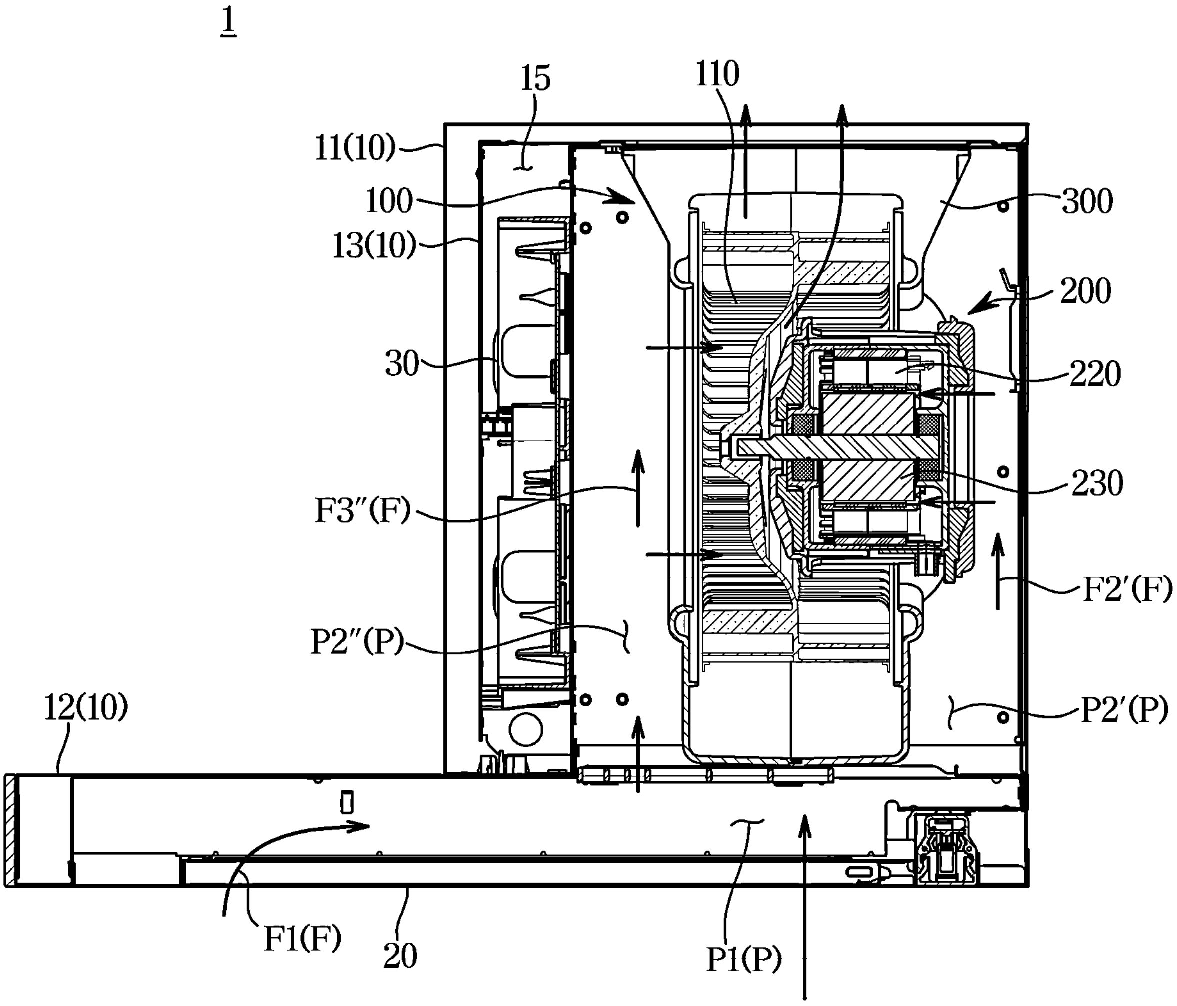
FIG. 4 is a cross-sectional view illustrating the range hood of FIG. 3 cut along the side according to an embodiment of the present disclosure.

FIG. 4 is a cross-sectional view showing the range hood 1 of FIG. 3 cut along the side.

As shown in FIG. 4, the fan module 100 may be disposed on the inner side of the upper housing 11.

The fan module 100 may include the blowing fan 110 provided to flow air. The fan module 100 may include a motor 200 that may provide a driving force to rotate the blowing fan 110. The fan module 100 may include a case 300 positioned adjacent to the motor 200.

When the blowing fan 110 is rotated by the motor 200, air may enter the housing 10 through the inlet 20 formed on the lower surface of the lower housing 12, thereby forming a main flow F1. The main flow F1 may move toward the upper housing 11 along a main flow path P1 formed by the lower housing 12.

The discharge flow path P may be formed between the fan module 100 and the upper housing 11. A first discharge flow path P2' may be formed between a rear side of the fan module 100 and a rear side of the upper housing 11. A second discharge flow path P2" may be formed between a front side of the fan module 100 and a front side of the upper housing 11. The first discharge flow path P2' and the second discharge flow path P2" may be connected to the main flow path P1 formed by the lower housing 12.

The first discharge flow F2' may flow through the first discharge flow path P2'. The second discharge flow F2" may flow through the second discharge flow path P2". The first discharge flow F2' and the second discharge flow F2" may be connected to the main flow F1. In other words, the main flow F1 may be divided into the first discharge flow F2' and the second discharge flow F2".

The first discharge flow F2' may flow through a fan inlet 101 (see FIG. 5) formed in the case 300 positioned adjacent to the motor 200. The first discharge flow F2' may flow along an interior of the case 300 through the fan inlet 101. The first discharge flow F2' may flow through the interior of the case 300 toward the fan outlet (see FIG. 5).

The second discharge flow F2" may flow through the fan inlet 101 (see FIG. 5) formed in the case 300 positioned adjacent to the blowing fan 110. The second discharge flow F2" may flow along the interior of the case 300 through the fan inlet 101. The second discharge flow F2" may flow through the interior of the case 300 toward the fan outlet (see FIG. 5).

The first discharge flow F2' and the second discharge flow F2" may be discharged to the outdoors through the duct 4 via the fan outlet.

The range hood 1 may include an electrical equipment 30 within the housing 10 that is configured to control the fan module 100.

The upper housing 11 may include an inner housing 10 within which the fan module 100 is located.

The upper housing 11 may include an electrical housing 13 arranged to receive the electrical equipment 30 in front of the inner housing 10. An electrical compartment 15 in which the electrical equipment 30 is located may be formed on an inner side of the electrical housing 13.

The motor 200 may include a rotor 220 and a stator 230. The stator 230 may be fixed to an inner surface of the case 300. The rotor 220 may be rotatably inserted into an inner side of the stator 230. The rotor 220 may include a magnet. The stator 230 may include metal to allow current to flow. When current flows through the stator 230, a magnetic field is formed, and the rotor 220 may rotate in response to such a magnetic field.

At this time, an attractive force may be generated between the rotor 220 and the stator 230. This is because the rotor 220 includes a magnet and the stator 230 includes metal. The torque generated by the attractive force between the rotor 220 and the stator 230 may be referred to as cogging torque.

The motor 200 may generate noise while being driven by the cogging torque. The rotor 220 and the stator 230 may be subject to a cogging torque at a certain position, and vibration may occur when the rotor 220 rotates beyond such a torque. The vibration may cause noise. When the motor 200 is driven, the rotor 220 may rotate at a constant speed. Accordingly, vibration due to cogging torque may also occur with a certain cycle. The vibration caused by the cogging torque may be represented in terms of a specific frequency.

When the range hood 1 is in operation, noise may be generated by the blowing fan 110. When the noise caused by the cogging torque is added to the noise caused by the blowing fan, a user may feel uncomfortable.

The noise may be caused by vibrations generated by the motor 200 being transmitted to surrounding objects, resulting in contact between the motor 200 and objects surrounding the motor 200. Accordingly, reducing the noise generated by the motor 200 may relate to a method of not transmitting vibrations generated by the motor 200 to objects surrounding the motor 200.

Before considering this in detail, the motor 200 and a configuration surrounding the motor 200 will be described.

Figure 5:
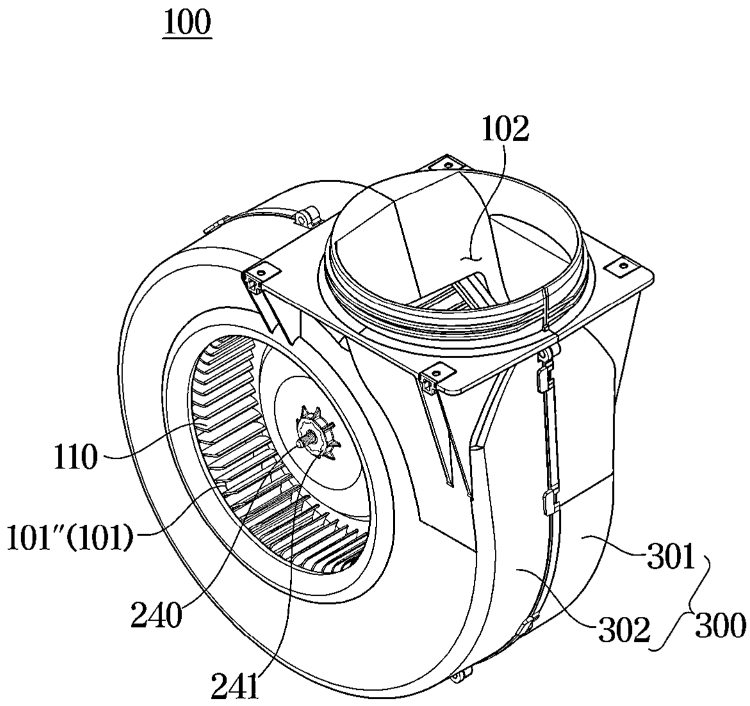
FIG. 5 is a perspective view illustrating a fan module of the range hood of FIG. 3 according to an embodiment of the present disclosure.

FIG. 5 is a perspective view showing the fan module 100 of the range hood 1 of FIG. 3.

As shown in FIG. 5, the fan module 100 may include the case 300. The case 300 may include a front case 302 located at the front and a rear case 301 located at the rear.

The fan module 100 may include the blowing fan 110 positioned on an inner side of the case 300.

The motor 200 may include a rotating shaft 240 disposed along a rotation axis and extending toward the front case 302. In addition, the rotating shaft 240 may be supported by a bearing 241.

The fan inlet 101 may be formed on the front side or rear side of the case 300 to allow air to enter.

A fan outlet 102 may be formed on an upper side of the case 300 to allow air to exit toward the duct 4.

The configuration of the fan module 100 will be described in more detail.

Figure 6:
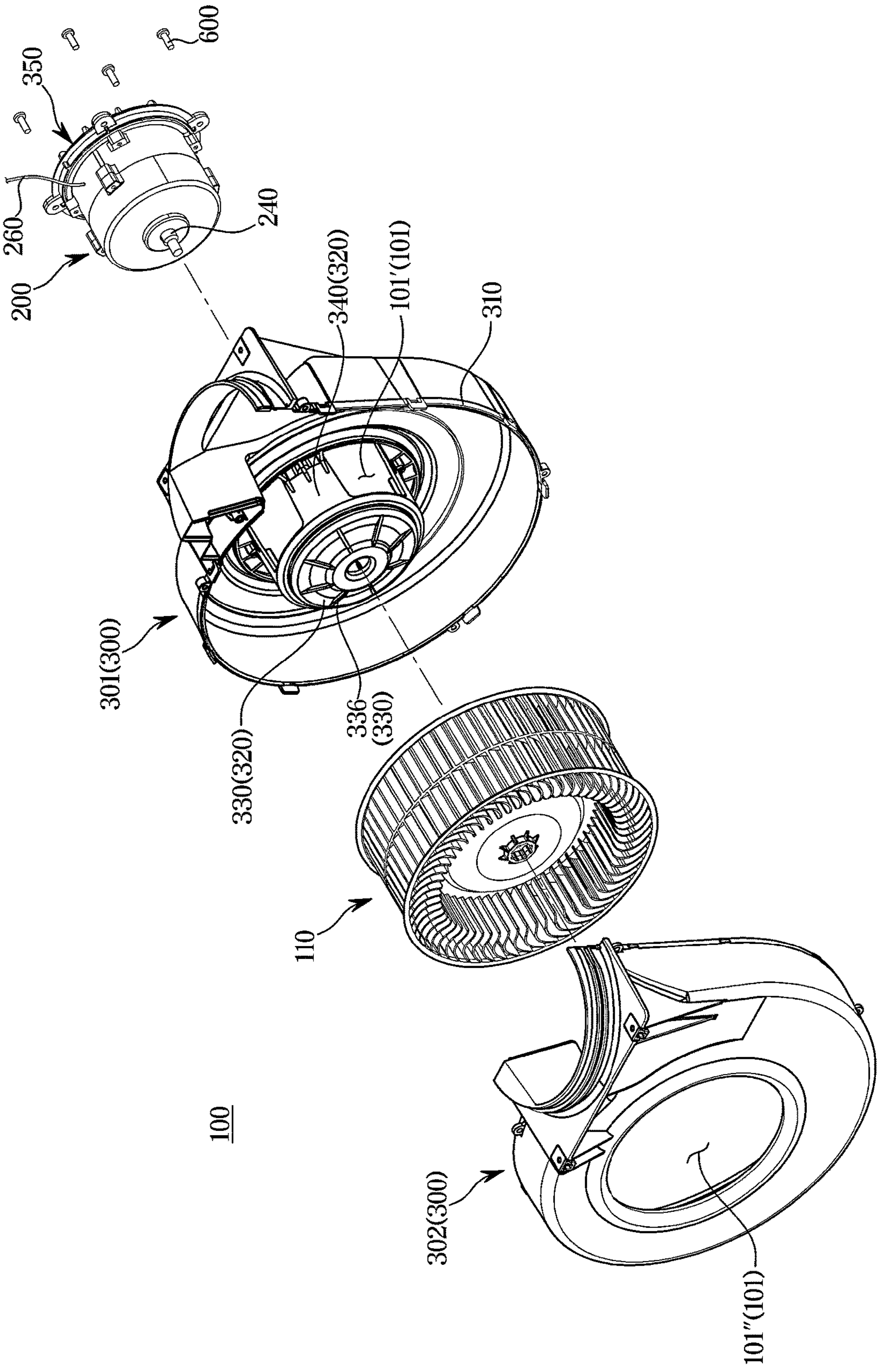
FIG. 6 is an exploded perspective view illustrating the fan module of FIG. 5 disassembled according to an embodiment of the present disclosure.
Figure 7:
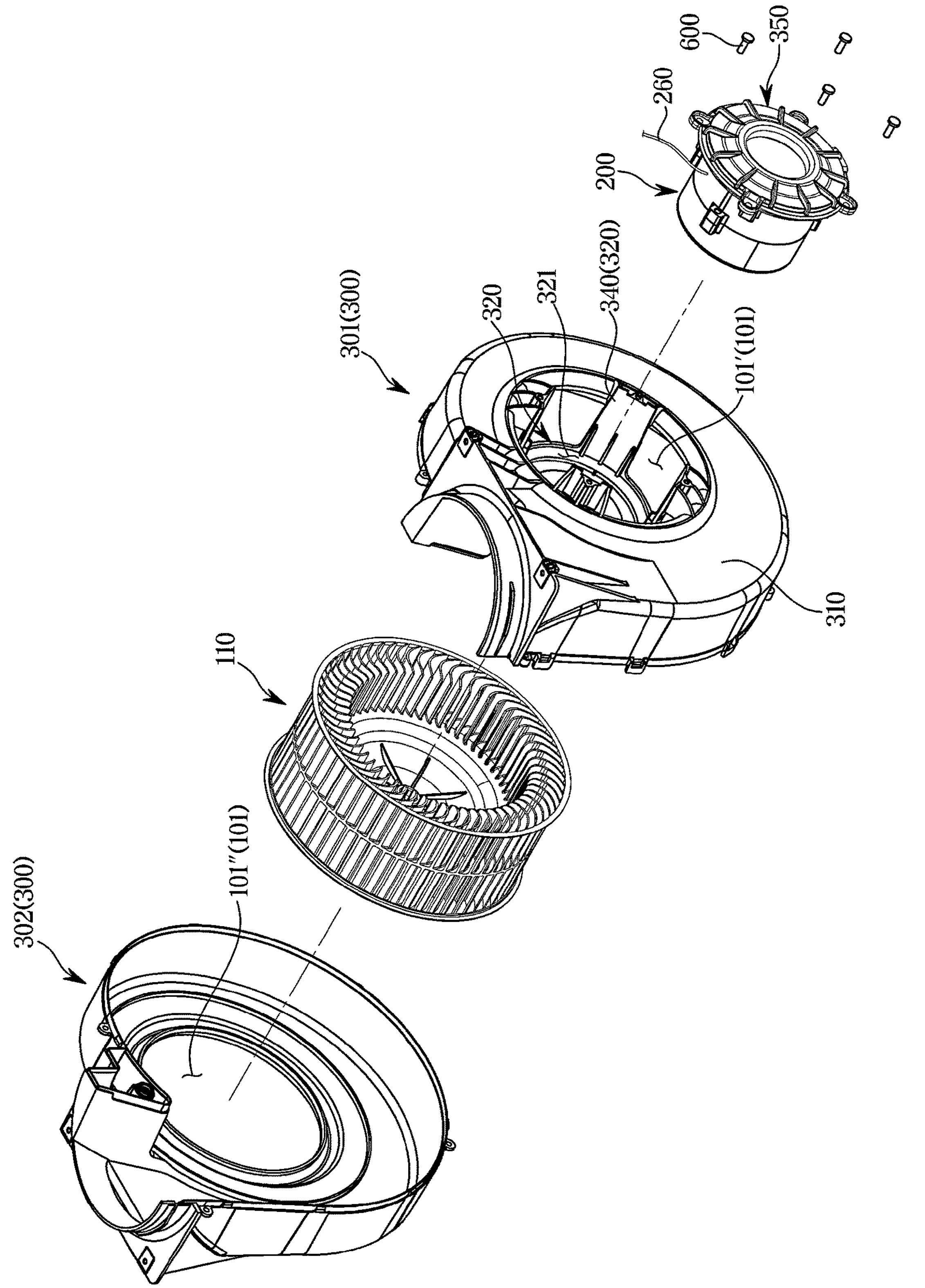
FIG. 7 is an exploded perspective view illustrating the fan module of FIG. 6 from the rear according to an embodiment of the present disclosure.

FIG. 6 is an exploded perspective view showing the fan module 100 of FIG. 5. FIG. 7 is an exploded perspective view showing the fan module 100 of FIG. 6 from the rear.

As shown in FIGS. 6 and 7, the blowing fan 110 may be disposed between the front case 302 and the rear case 301.

The rear case 301 may include a case body 310 forming an exterior thereof.

The rear case 301 may include a seated portion 320 forming a seated space 321 that accommodates at least a portion of the motor 200. However, the present disclosure is not limited thereto and the seated portion 320 may be formed on the front case 302.

The seated portion 320 may be formed to be recessed toward the front case 302.

The seated portion 320 may include a seating plate 330 provided to be positioned on the inner side of the rear case 301.

The seated portion 320 may include a seat post 340 connecting the seating plate 330 and the case body 310. The seat post 340 may be provided in a plurality.

The seated space 321 surrounded by the seating plate 330 and the seat posts 340 may be provided to accommodate the motor 200.

A case shaft hole 338 may be formed in the seating plate 330, through which the rotating shaft 240 of the motor 200 passes.

The case shaft hole 338 may be formed to have a diameter larger than that of the rotating shaft 240. This is because the case shaft hole 338 should not be in contact with the rotating shaft 240 during operation.

The seating plate 330 may include a plurality of plate support ribs 336 on the front side extending radially around the case shaft hole 338, to increase the strength of the seating plate 330. The plurality of plate support ribs 336 may be arranged to be spaced apart in a circumferential direction about the case shaft hole 338.

The fan inlet 101 may include a first fan inlet 101' provided between the plurality of seat posts 340 and a second fan inlet 101" provided at the center of the front case 302.

The motor 200 may include a lead wire 260 to supply power to the motor 200.

The lead wire 260 may be disposed between the plurality of seat posts 340.

The configuration of the coupling between the motor 200 and the case 300 will be described in more detail below.

Figure 8:
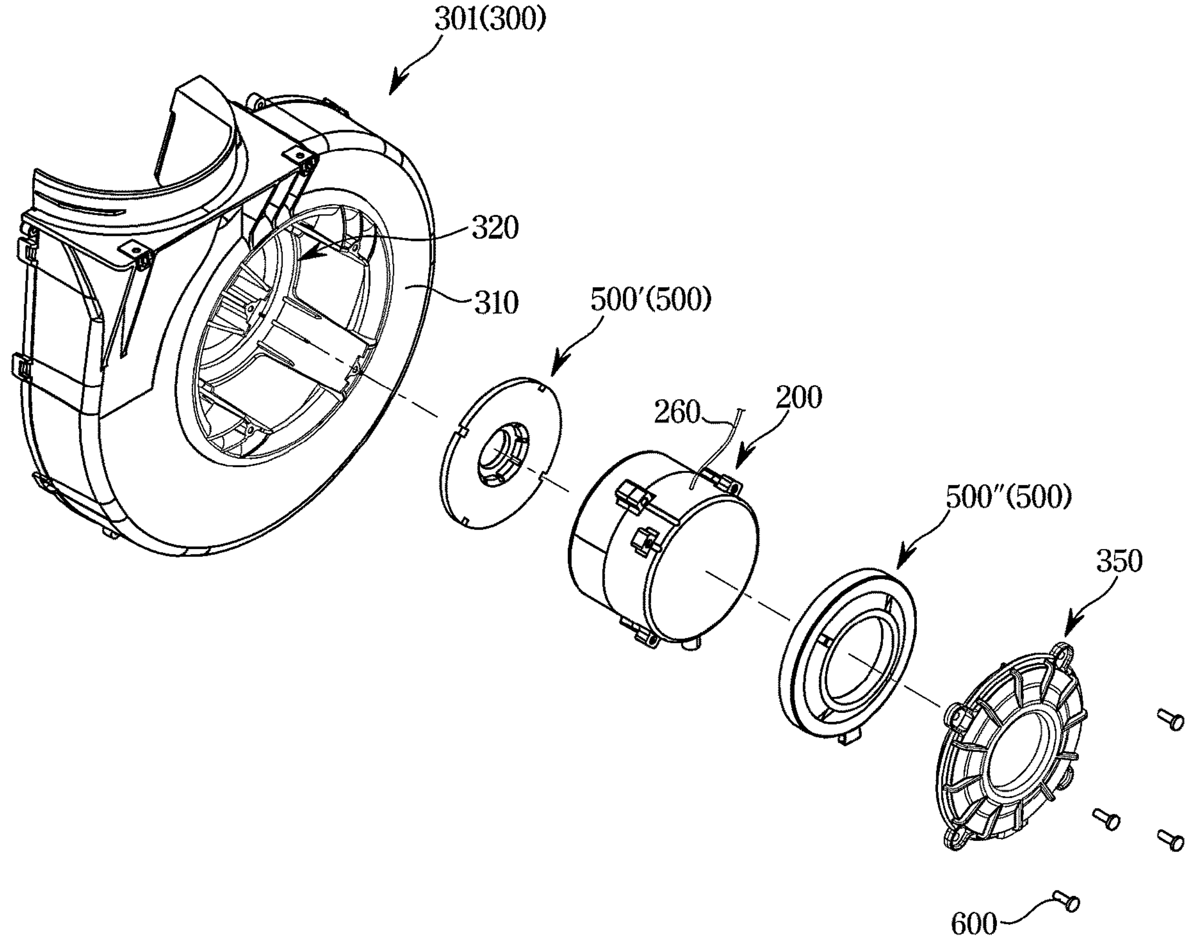
FIG. 8 is an exploded perspective view illustrating only a case, an anti-vibration member, and a motor of FIG. 7 according to an embodiment of the present disclosure.

FIG. 8 is an exploded perspective view showing only the case 300, an anti-vibration member 500, and the motor 200 of FIG. 7.

As shown in FIG. 8, the rear case 301 may include a main body of the case 300, and the seated portion 320 forming the seated space 321.

The case 300 may include a motor cover 350 provided to cover a rear surface of the motor 200. The motor cover 350 may be coupled to the case body 310 by a fastening member 600. In the event that the motor cover 350 covers the entire rear of the seated space 321, air may not be drawn into the first fan inlet 101', so preferably, the motor cover 350 may be coupled to the case 300 such that it has portions spaced apart at a certain distance therefrom.

As described above, in order to reduce the noise of the range hood 1, it is necessary to prevent the vibration of the motor 200 from being transmitted to surrounding configurations. Since the case 300 is positioned around the motor 200, it is necessary to prevent the vibration of the motor 200 from being transmitted to the case 300.

To prevent the transmission of vibration from the motor 200 to the case 300, the motor 200 may include an anti-vibration member 500 in contact with the motor 200.

More particularly, the anti-vibration member 500 may include a first anti-vibration member 500' provided between the motor 200 and the seated portion 320, and a second anti-vibration member 500" provided between the motor 200 and the motor cover 350.

In order for the blowing fan 110 to draw in air, the motor 200 may preferably rotate at a speed of about 280 Hz (700 rpm) or more.

Assuming that a low-noise mode is complemented by reducing the rotational speed of the blowing fan 110 to produce less noise, the motor 200 may rotate at a speed of 180 Hz (450 rpm) to 280 Hz (700 rpm).

Accordingly, it can be appreciated that the vibration caused by the cogging torque of the motor 200 has a similar range of frequencies.

The noise generated by the vibration may become louder if resonance occurs. Resonance may refer to a phenomenon in which an object vibrates with a large amplitude in its natural frequency range. If the frequency of the motor 200 matches the natural frequency of the case 300 and resonates with the case 300, loud noise may be generated.

The case 300 may include plastic. The natural frequency of the plastic may be about 180 Hz to 300 Hz.

The natural frequency of the plastic may be within the range of frequencies that the motor 200 may have. Therefore, when the motor 200 and the case 300 are in contact, resonance may occur in the case 300, thereby causing noise to be amplified.

In this case, the anti-vibration member 500 may include a soft material. The soft material may include rubber or the like. In this case, the hardness of the soft material may be 30 to 70. In particular, the hardness of the soft material may be about 50. The natural frequency of rubber is about 1 Hz.

The natural frequency of rubber may be outside the range of the frequency that the motor 200 may have. Accordingly, when the motor 200 and the rubber are in contact, the rubber may not resonate, so that the noise is not amplified.

Consequently, when the anti-vibration member 500, which is made of a soft material, is positioned between the case 300 and the motor 200, the vibration of the motor 200 may not cause the case 300 or the anti-vibration member 500 to resonate, thereby causing the noise not to be amplified.

In this case, the anti-vibration member 500 may also act as a damper. The anti-vibration member 500 may absorb the vibration energy of the vibration of the motor 200, thereby reducing the amount of vibration energy generated by the motor 200.

As a result, by placing the anti-vibration member 500 in contact with the motor 200, the vibration generated by the motor 200 may be prevented from being transmitted to the case 300.

More particularly, the first anti-vibration member 500' may be positioned between the motor 200 and the seated portion 320 of the case 300, and thus the first anti-vibration member 500' may prevent the vibration of the motor 200 from being transmitted to the seated portion 320 of the case 300.

The second anti-vibration member 500" may be positioned between the motor 200 and the motor cover 350 of the case 300, and thus the second anti-vibration member 500" may prevent the vibration of the motor 200 from being transmitted to the motor cover 350.

The motor cover 350 may be coupled to the seat posts 340 included in the seated portion 320 of the case 300 by the fastening member 600.

When the first anti-vibration member 500', the motor 200, and the second anti-vibration member 500" are accommodated in the seated portion 320 of the case 300, a gap between the motor cover 350 and the anti-vibration member 500 may not be formed when the motor cover 350 is coupled to the seat posts 340.

When the anti-vibration member 500 is pressed and compressed, the strength of the anti-vibration member 500 may increase. In this case, the damping coefficient may be reduced and the anti-vibration member 500 may become less effective as a damper.

To this end, a surface of the anti-vibration member 500 facing the motor 200 may be formed to correspond to the shape of a surface of the motor 200 facing the anti-vibration member 500.

For example, a first side of the anti-vibration member 500 facing the motor 200 may be a plane, and a first side of the motor 200 facing the anti-vibration member 500 may also be a plane.

However, to further limit the movement of the motor 200, when the motor cover 350 is coupled to the seat post 340, the motor cover 350 may be coupled by pressing the anti-vibration member 500 in a direction in which the motor cover 350 is coupled to the seat post 340.

In other words, when the fastening members 600 are coupled to the seat posts 340, the first anti-vibration member 500' and the second anti-vibration member 500" may be pressed in a direction closer to the motor 200. As a result, the motor 200 may be fixed, and thus the motor 200 may be prevented from translational movement in a direction parallel to the rotating shaft of the motor 200.

To prevent vibration of the motor 200, it is necessary to limit the movement of the motor 200.

The motor 200 may include a motor housing 210 forming an exterior thereof.

The rotating shaft 240 of the motor 200 may cause the motor housing 210 to rotate in the opposite direction of the rotating shaft 240 due to a reaction thereof.

The motor 200 may include the lead wire 260 disposed on one side of the motor housing 210. The lead wire 260 may be positioned between the plurality of seat posts 340.

When the motor housing 210 is rotated, the lead wire 260 may contact the seat posts 340. As a result, the lead wire 260 may be damaged. To prevent such a situation, it may be necessary to prevent the rotation of the motor housing 210.

The range hood 1 may include a fixer positioned between the anti-vibration member 500 and at least one of the case 300 or the motor 200 such that relative movement between the anti-vibration member 500 and at least one of the case 300 or the motor 200 may be prevented.

More particularly, the motor 200 may be arranged to rotate in the direction of rotation about the rotating shaft, and the fixer 900 may be arranged between the anti-vibration member 500 and the case 300 to prevent the anti-vibration member 500 from moving relatively to the direction of rotation of the case 300 and the motor 200.

In other words, rotation of the motor housing 210 may be prevented by the fixer 900. Specific embodiments of the fixer 900 will be described below.

However, before doing so, the case 300 and the first anti-vibration member 500' will be described in more detail.

Figure 9:
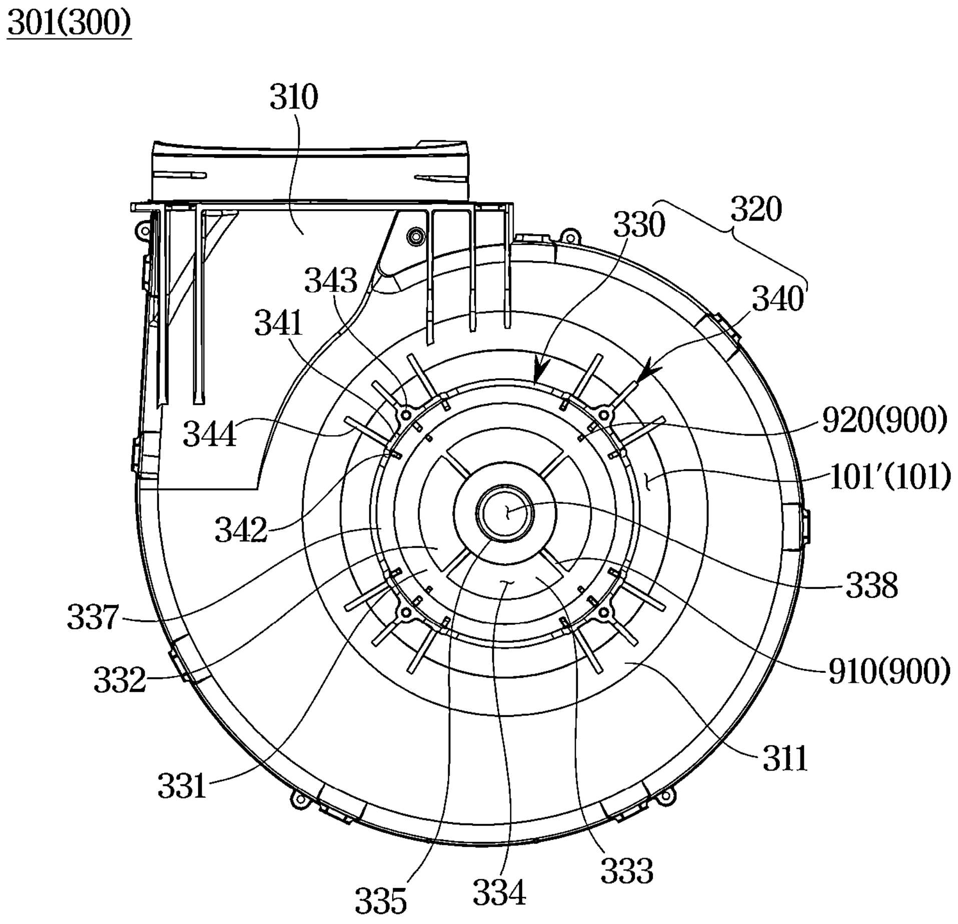
FIG. 9 is a rear view of the case of FIG. 8 from the rear according to an embodiment of the present disclosure.

FIG. 9 is a rear view of the case 300 of FIG. 8 from the rear.

As shown in FIG. 9, the case 300 may include the case body 310 forming the exterior. The case body 310 may be formed on both the rear case 301 and the front case 302. However, for ease of description, it will be assumed and described that the case body 310 is formed on the rear case 301.

The rear case 301 may include the seated portion 320 formed at a central portion of the case body 310 that is recessed toward the inner side of the case 300. The seated portion 320 may include the seating plate 330 disposed on the inner side of the case 300 and the seat posts 340 disposed to connect the seating plate 330 and the case body 310.

The shape of the seating plate 330 is not limited to any shape, but for ease of description, it is assumed and described to have an approximate shape of a disc.

In the center of the seating plate 330, the case shaft hole 338 may be formed through which the rotating shaft 240 of the motor 200 passes.

The seating plate 330 may be arranged in an annular shape and may include a seated flat portion 331 having a flat surface facing the motor 200.

The seating plate 330 may include a seated inclined portion 332 extending from the seated flat portion 331 toward the case shaft hole 338, with a surface facing the motor 200 extending from the seated flat portion 331 and formed to be inclined forwardly.

The seating plate 330 may include a seated flange 335 that is provided to surround the case shaft hole 338 and is formed to protrude rearwardly.

The seating plate 330 may include a seated flange connecting portion 333 connecting the seated flange 335 and the seated inclined portion 332. In other words, the seated flange 335 may be formed to be bent and extend rearwardly from an end of the side facing the case shaft hole 338 of the seated flange connecting portion 333.

The seated flange connecting portion 333 may be arranged to retreat forwardly from the seated inclined portion 332 in a stepped manner. The seated flange connecting portion 333 may form a stepped recess 334.

The shape of the seating plate 330 described above may be formed to correspond to the shape of the surface facing the seating plate 330 of the first anti-vibration member 500', which will be described later. Accordingly, the reception of the first anti-vibration member 500' in the seating plate 330 may be guided.

The fixer 900 may include a fixing protrusion 910 on the seating plate 330 that protrudes toward the first anti-vibration member 500'. The fixing protrusion 910 may be provided in a plurality.

The fixing protrusion 910 may each be arranged on the seated inclined portion 332.

The fixing protrusion 910 may be formed to extend in a radial direction around the case shaft hole 338.

The plurality of fixing protrusions 910 may be spaced apart in the circumferential direction around the case shaft hole 338. In other words, the plurality of fixing protrusions 910 may be arranged to be spaced apart in the circumferential direction about the rotation axis.

The fixer 900 may include a guide protrusion 920 disposed on the seating plate 330 to correspond to an edge portion of the first anti-vibration member 500' and protruding toward the first anti-vibration member 500'. The guide protrusion 920 may be provided in a plurality.

The plurality of guide protrusion 920 may be arranged on the seated flat portion 331.

The plurality of guide protrusions 920 may be arranged to be spaced apart in the circumferential direction around the case shaft hole 338. The direction in which the guide protrusions 920 extend may correspond to the direction in which the fixing protrusions 910 extend.

The plurality of guide protrusions 920 may be spaced from each other in the circumferential direction around the case shaft hole 338. A position in which the guide protrusions 920 are disposed may correspond to a position in which the fixing protrusions 910 are disposed.

The fixing protrusions 910 and guide protrusions 920 included in the fixer 900 may be formed to correspond to fixing grooves 911 and guide grooves 921 that may be formed on the anti-vibration member 500, which will be described later, respectively. As a result, relative movement between the anti-vibration member 500 and the case 300 may be prevented. This will be described in more detail below with reference to the accompanying drawings.

The seating plate 330 may include an inner connecting ring 337 provided to surround the seated flat portion 331.

The seat post 340 may extend from the inner connecting ring 337 and be connected to the case body 310.

The seat post 340 may include a seat post body 341 extending rearwardly from the inner connecting ring 337.

The seat post 340 may include a post support rib 342 that is coupled to the inner connecting ring 337 on a surface of the seat post body 341 facing the seated space 321, protrudes toward the seated space 321, and extends rearwardly. The post support rib 342 may be provided in a plurality. The strength of the seat post body 341 may be increased by the post support ribs 342. The plurality of post support ribs 342 may include the post support rib 342 disposed at the center of the seat post 340 and the post support rib 342 disposed at both sides thereof.

A coupling hole 343 may be formed at a rear end of the seat post body 341 to allow the fastening member 600 to be fastened thereto.

The seat post 340 may include a connecting rib 334 connecting the seat post body 341 and the case body 310. The connecting rib 334 may extend toward a portion of the case body 310 that is closest thereto.

The connecting rib 334 may be provided in a plurality. The plurality of connecting ribs 334 may include the connecting rib 334 extending from the center of the seat post body 341 and the connecting rib 334 disposed on both sides of the center thereof.

Each of the plurality of connecting ribs 334 may be spaced apart from each other. The first fan inlet 101' may be formed between the plurality of connecting ribs 334.

The case body 310 may include an outer connecting ring 311 arranged to be coupled with the connecting ribs 334 and protruding rearwardly.

The radius of the seating plate 330 may be smaller than the radius of the outer connecting ring 311. The first fan inlet 101' may be formed between the seating plate 330 and the outer connecting ring 311.

Figure 10:
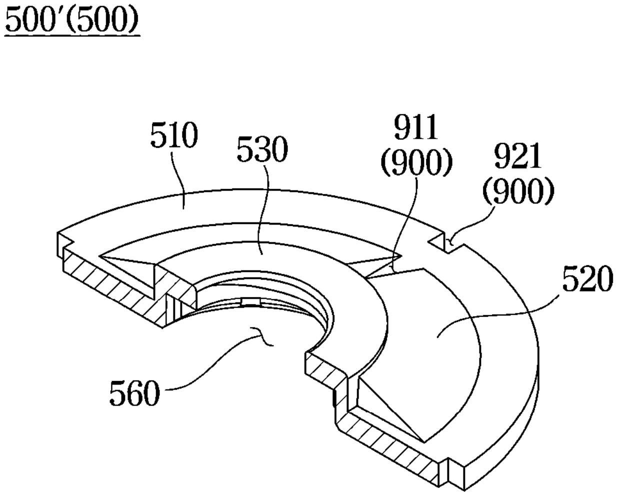
FIG. 10 is a cross-sectional perspective view illustrating the anti-vibration member of FIG. 8 cut along a guide groove according to an embodiment of the present disclosure.

FIG. 10 is a cross-sectional perspective view showing the anti-vibration member 500 of FIG. 8 cut along the guide groove 921.

As shown in FIG. 10, the anti-vibration member 500 may have a substantially disc shape. However, the present disclosure is not limited thereto and the anti-vibration member 500 may include the shape of a post.

FIG. 10 shows an example of the anti-vibration members 500, the first anti-vibration member 500'.

A member shaft hole 560 through which the rotating shaft 240 passes may be formed at the center of the first anti-vibration member 500'.

The diameter of the member shaft hole 560 may be larger than the diameter of the rotating shaft 240. This is because the rotating shaft 240 that rotates during driving should not be in contact with the member shaft hole 560.

The first anti-vibration member 500' may include a flat portion 510 provided to surround an edge thereof. In other words, the flat portion 510 may be positioned on the edge of the first anti-vibration member 500'.

The first anti-vibration member 500' may include an inclined portion 520 that extends from the flat portion 510 toward the member shaft hole 560 and is inclined toward the case 300 as it approaches the member shaft hole 560. In other words, the inclined portion 520 may be positioned on an inner side of the flat portion 510 and be inclined toward the case 300 as it approaches the rotating shaft of the motor 200.

The first anti-vibration member 500' may include a stepped portion 530 that protrudes forwardly from the inclined portion 520. In other words, the stepped portion 530 may protrude toward the seated portion 320 of the first anti-vibration member 500'.

As described above, the seated portion 320 of the first anti-vibration member 500' may include the stepped recess 334 formed to correspond to the stepped portion 530 in a direction away from the first anti-vibration member 500' around the rotation axis so as to guide the stepped portion 530. As the stepped portion 530 is accommodated in the stepped recess 334, the first anti-vibration member 500' may be coupled to the case 300 at a precise location, and thus the stepped portion 530 may enhance the assemblability of the first anti-vibration member and the case 300.

The fixer 900 may include the fixing grooves 911 formed to correspond to the fixing protrusions 910 on the first anti-vibration member 500'. The fixing protrusions 910 may be inserted into the fixing grooves 911 to prevent relative movement of the first anti-vibration member 500' and the case 300.

The fixing grooves 911 may be arranged on a surface at which the first anti-vibration member 500' faces the case 300.

The first anti-vibration member 500' may include a first side 501 facing the case 300, and a second side 502 located on the opposite side of the first side 501 and facing the motor 200. In this case, the fixing grooves 911 may be formed on the first side 501.

The fixing grooves 911 may extend in the radial direction of the rotating shaft of the motor 200. The fixing groove 911 may be concave in a direction away from the motor 200 as it approaches the rotating shaft of the motor 200.

The fixing protrusions 910 may be inserted into the fixing grooves 911. In particular, the fixing protrusions 910 may be formed to correspond to the shape of the fixing grooves 911 and inserted therein.

In other words, the fixing protrusions 910 may be configured to protrude from one surface of the case 300 toward the anti-vibration member 500, extend in the radial direction with respect to the rotating shaft of the motor 200, and further protrude from the one surface of the case 300 as it approaches the rotating shaft of the motor 200.

When the motor 200 rotates, a certain torque may be generated in the direction of rotation of the motor 200. The fixing grooves 911 and the fixing protrusions 910 for restricting the rotation of the motor 200 may receive the torque generated by the motor 200 in the process of restricting the movement of the motor 200. The torque may be calculated as the product of the force generated at a point and the distance from a source of the torque. Thus, if the torque is constant, the greater the distance from the source of the torque, the less force is generated. The source of the torque may be in the vicinity of the rotating shaft 240. As a result, the further away from the rotating shaft 240, the smaller the force received, and the closer to the rotating shaft 240, the larger the force received.

The fixing grooves 911 and the fixing protrusions 910 may be formed to extend radially from the rotating shaft of the motor 200. A portion of the fixing grooves 911 and the fixing protrusions 910 that is located closer to the rotating shaft 240 may receive a greater force than a portion that is further away from the rotating shaft 240. When a strong force is applied, the fixing protrusions 910 may be deviated from the fixing grooves 911. The anti-vibration member 500 may be coupled to the case 300 only when the fixing protrusions 910 are accommodated in the fixing grooves 911. Accordingly, in order to ensure that the fixing protrusion 910 is accommodated more deeply in the fixing grooves 911 as it approaches the rotating shaft 240, the fixing grooves 911 may be formed to be more concave and the fixing protrusions 910 may be formed to protrude further as they approach the rotating shaft 240.

The fixer 900 may include the guide groove 921 formed to correspond to the guide protrusions 920 on the first anti-vibration member 500'. The guide protrusion 920 may each be inserted into the guide groove 921 to prevent relative movement of the first anti-vibration member 500' and the case 300.

The guide grooves 921 may be disposed on the edge (or rim) of the first anti-vibration member 500'. Accordingly, the guide protrusions 920 may be seen through the guide grooves 921, so that the guide grooves 921 and the guide protrusions 920 may be aligned so that the first anti-vibration member 500' may be coupled to the case 300 at a precise location.

In other words, the fixer 900 may include the guide grooves 921 that are concave from the edge of the anti-vibration member 500 to the inside of the anti-vibration member 500. The fixer 900 may include the guide protrusions 920 that are arranged to be inserted into the guide grooves 921 on the case 300.

Figure 11:
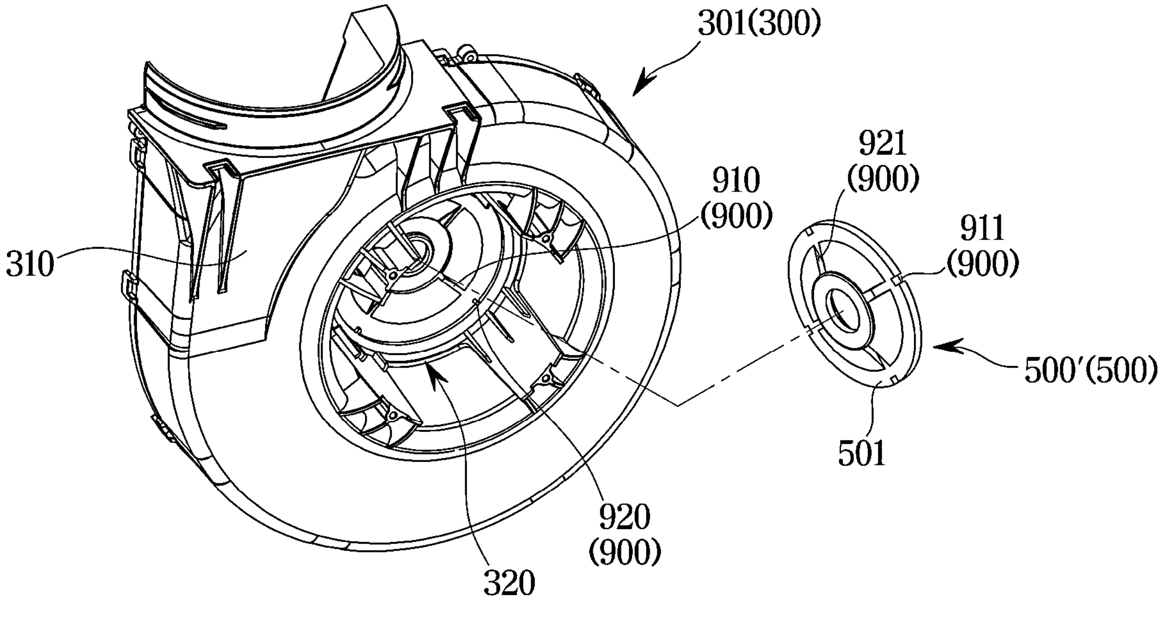
FIG. 11 is an exploded perspective view illustrating a rear case and a first anti-vibration member of FIG. 8 disassembled according to an embodiment of the present disclosure.

FIG. 11 is an exploded perspective view showing the rear case 301 and the first anti-vibration member 500' of FIG. 8 disassembled.

As shown in FIG. 11, the first anti-vibration member 500' may be coupled to the seated portion 320 of the rear case 301.

A surface of the seating plate 330 facing the first anti-vibration member 500' may be formed to correspond to a surface of the first anti-vibration member 500' facing the seating plate 330. As a result, a gap may not be formed or a small gap may be formed between the seating plate 330 and the first anti-vibration member 500', thereby preventing foreign substances from entering the gap, or vapor from entering the gap. When foreign substances enter the gap between the seating plate 330 and the first anti-vibration member 500', the coupling between the seating plate 330 and the first anti-vibration member 500' may be weakened. Accordingly, by forming the surface of the seating plate 330 facing the first anti-vibration member 500' to correspond to the surface of the first anti-vibration member 500' facing the seating plate 330, the coupling between the seating plate 330 and the first anti-vibration member 500' may be strengthened.

The fixing protrusions 910 may be formed on the seating plate 330. The fixing protrusions 910 may be received in the fixing grooves 911 formed on the first anti-vibration member 500'. The fixing protrusions 910 may be received in the fixing grooves 911, so that the case 300 to which the fixing protrusions 910 are coupled and the first anti-vibration member 500' in which the fixing grooves 911 are formed may be coupled.

The fixing protrusions 910 may protrude toward the inclined portion 520 of the first anti-vibration member 500'. Since the inclined portion 520 may be provided on the inside of the first anti-vibration member 500', the fixing protrusions 910 may fix the inside of the first anti-vibration member 500' to the case 300.

However, the present disclosure is not limited as above, and the fixing protrusions 910 and the fixing grooves 911 may be formed on either the first anti-vibration member 500' or the case 300.

The guide protrusions 920 may be formed on the seating plate 330. The guide protrusions 920 may be received in the guide grooves 921 formed on the edge of the first anti-vibration member 500'. The guide protrusions 920 may be received in the guide grooves 921, so that the case 300 to which the guide protrusions 920 are coupled and the first anti-vibration member 500' in which the guide grooves 921 are formed may be coupled.

The guide protrusions 920 may protrude toward the flat portion 510 located on the edge of the first anti-vibration member 500'. The guide grooves 921 formed in the first anti-vibration member 500' may be formed to be open in the front-to-back direction. Accordingly, when the first anti-vibration member 500' is coupled to the case 300, the coupling may be performed while ensuring that the guide grooves 921 are arranged in a position corresponding to the guide protrusions 920. As a result, the coupling of the case 300 and the first anti-vibration member 500' may be facilitated by the guide grooves 921 and the guide protrusions 920.

However, the present disclosure is not limited as above, and the guide protrusions 920 and the guide grooves 921 may be formed on either the first anti-vibration member 500' or the case 300.

The stepped portion 530 of the first anti-vibration member 500' may be received in a seated recess formed in the seated portion 320 of the case 300. Because the stepped portion 530 protrudes toward the case 300 to form a step and the stepped recess 334 is formed to correspond to the shape of the stepped portion 530, the stepped portion 530 may be easily coupled to the stepped recess 334. More particularly, the coupling of the first anti-vibration member 500' and the case 300 may be guided by the stepped portion 530 and the stepped recess 334. In other words, the stepped portion 530 and the stepped recess 334 may help to ensure that the first anti-vibration member 500' and the case 300 are coupled at a precise location, thereby increasing the couplability of the first anti-vibration member 500' and the case 300.

Figure 12:
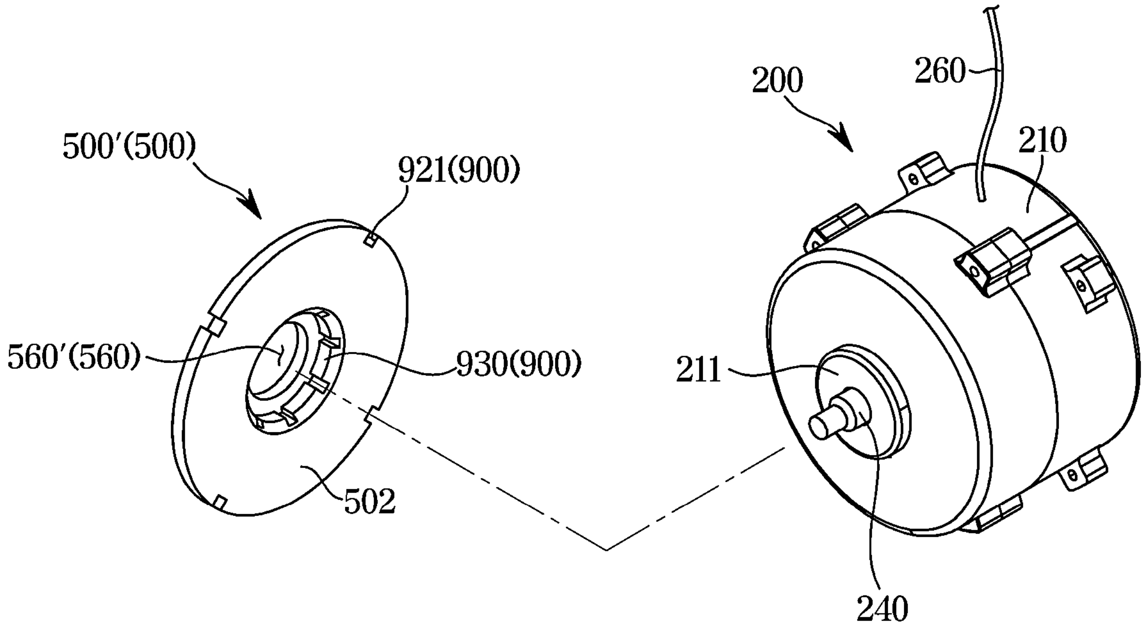
FIG. 12 is an exploded perspective view illustrating the first anti-vibration member and the motor of FIG. 8 disassembled according to an embodiment of the present disclosure.

FIG. 12 is an exploded perspective view showing the first anti-vibration member 500' and the motor 200 of FIG. 8 disassembled.

As shown in FIG. 12, the first anti-vibration member 500' may be coupled to the motor 200.

The motor 200 may include the motor housing 210 forming an exterior. The motor housing 210 may include a motor protrusion 211 that protrudes toward the first anti-vibration member 500'.

The first anti-vibration member 500' may be formed to be concave in a direction away from the motor housing 210 at a position corresponding to the motor protrusion 211.

The fixer 900 may include a friction protrusion 950 formed on the first anti-vibration member 500' to be in contact with the motor protrusion 211. The friction protrusion 950 may extend from the first anti-vibration member 500'.

In other words, the motor housing 210 may include the motor protrusion 211 positioned to correspond to the rotating shaft 240 and protruding toward the case 300. The first anti-vibration member 500' may include the member shaft hole 560 through which the rotating shaft 240 passes.

To prevent relative rotation of the case 300 with respect to the first anti-vibration member 500', the fixer 900 may include an anti-rotation protrusion 930 that surrounds the member shaft hole 560 on the first anti-vibration member 500' and protrudes toward the motor protrusion 211 so as to be in contact with the motor protrusion 211.

The anti-rotation protrusions 930 may be provided in a plurality. The anti-rotation protrusions 930 may be spaced apart from each other in the circumferential direction around the member shaft hole 560.

The surface on which the first anti-vibration member 500' faces the motor 200 may be arranged to correspond to the surface on which the motor 200 faces the first anti-vibration member 500'.

In other words, the surface of the first anti-vibration member 500' that surrounds the member shaft hole 560 and in contact with the motor 200 on the second side 502 of the first anti-vibration member 500' may be formed to correspond to the surface of the motor 200 in contact with the motor 200 on the surface of the motor 200 facing the first anti-vibration member 500'.

As a result, the gap between the first anti-vibration member 500' and the motor 200 may be prevented from being formed, thereby preventing a damping coefficient of the first anti-vibration member 500' from being lowered due to compression of the first anti-vibration member 500'.

The configuration that may be provided for the first anti-vibration member 500' described above may also be applied to the second anti-vibration member 500". Accordingly, the configuration expressed as the first anti-vibration member 500' in the foregoing description may be referred to as the anti-vibration member 500.

Figure 13:
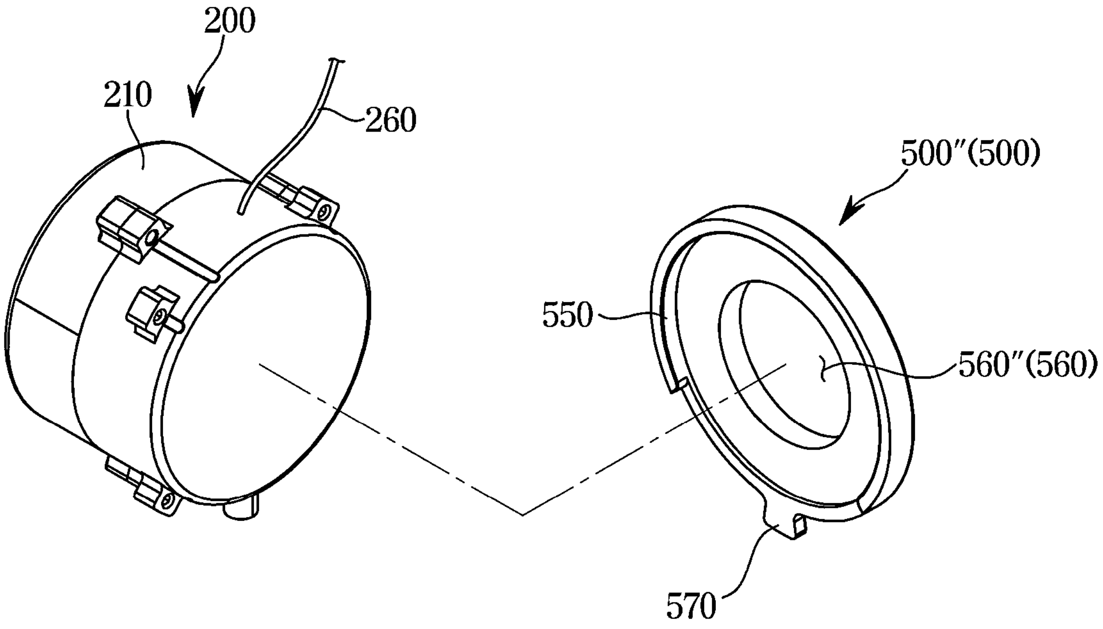
FIG. 13 is an exploded perspective view illustrating the motor and a second anti-vibration member of FIG. 8 disassembled according to an embodiment of the present disclosure.

FIG. 13 is an exploded perspective view showing the motor 200 and the second anti-vibration member 500" of FIG. 8 disassembled.

As shown in FIG. 13, the second anti-vibration member 500" may be coupled to the motor 200.

The second anti-vibration member 500" may include a cover portion 550 formed to cover a side surface of the motor housing 210. The cover portion 550 may be provided to extend toward the case 300. The cover portion 550 may be formed to cover at least a portion of an edge of the second anti-vibration member 500".

The cover portion 550 may be arranged to contact the side surface of the motor housing 210. Relative movement of the motor 200 and the cover portion 550 may be prevented by frictional force generated by the cover portion 550 contacting the side surface of the motor housing 210.

The member shaft hole 560 formed in the first anti-vibration member 500' may be referred to as the first member shaft hole 560'. A second member shaft hole 560" that is open to the motor cover 350 may be formed in the second anti-vibration member 500". In other words, the member shaft hole 560 may include the first member shaft hole 560' and the second member shaft hole 560".

The second member shaft hole 560" may allow heat generated when the motor 200 is driven to escape and prevent the temperature of the motor 200 from rising.

The second anti-vibration member 500" may include a guide handle 570 extending in a radial direction of the second member shaft hole 560".

Figure 14:
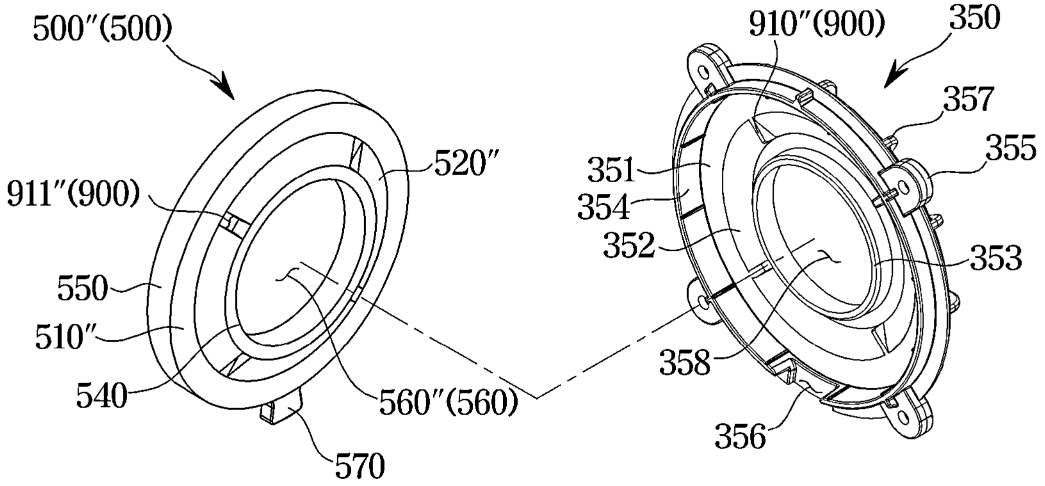
FIG. 14 is an exploded perspective view illustrating the second anti-vibration member and a motor cover of FIG. 8 disassembled according to an embodiment of the present disclosure.

FIG. 14 is an exploded perspective view showing the second anti-vibration member 500" and the motor cover 350 of FIG. 8 disassembled.

As shown in FIG. 14, the second anti-vibration member 500" may be coupled to the motor cover 350.

The second anti-vibration member 500" may be in the approximate shape of a disc. However, the present disclosure is not limited thereto.

The flat portion 510 included in the first anti-vibration member 500' may be referred to as a first flat portion 510'. The second anti-vibration member 500" may include a second flat portion 510" provided on the edge. In other words, the flat portion 510 may include the first flat portion 510' and the second flat portion 510".

The cover portion 550 may be formed to be bent and extend forwardly from the second flat portion 510".

The inclined portion 520 included in the first anti-vibration member 500' may be referred to as a first inclined portion 520'. The second anti-vibration member 500" may include a second inclined portion 520" having a surface facing the motor cover 350 on the second flat portion 510" that is inclined in a direction toward the motor cover 350, and extending toward the second member shaft hole 560". In other words, the inclined portion 520 may include the first inclined portion 520' and the second inclined portion 520".

The second anti-vibration member 500" may include a fixing portion 540 extending from the second inclined portion 520" toward the second member shaft hole 560".

The motor cover 350 may include a cover flat portion 351 provided to correspond to the second flat portion 510".

The motor cover 350 may include a cover inclined portion 352 provided to correspond to the second inclined portion 520".

A central portion of the motor cover 350 may be provided with a cover shaft hole 358 for communication in the front-to-back direction. Heat generated by the motor 200 may escape through the cover shaft hole 358.

The motor cover 350 may include a cover step portion 353 formed to be accommodated in the second member shaft hole 560" and extending forwardly. The cover step portion 353 may be formed to surround the cover shaft hole 358.

The motor cover 350 may include a cover edge portion 354 that is bent and extends forwardly from the cover flat portion 351 of the motor cover 350 so as to surround the second anti-vibration member 500".

The motor cover 350 may include cover support ribs 357 formed on a rear surface of the motor cover 350 to enhance strength.

A surface of the second anti-vibration member 500" facing the motor cover 350 may be provided to correspond to a surface of the motor cover 350 facing the second anti-vibration member 500". This may prevent foreign substances from penetrating between the second anti-vibration member 500" and the motor cover 350.

Since the case 300 includes the motor cover 350, the second anti-vibration member 500" may be considered to be coupled to the case 300.

The fixing protrusion 910 provided on the seated portion 320 may be referred to as a first fixing protrusion 910'. The fixer 900 may include a second fixing protrusion 910" that protrudes toward the second anti-vibration member 500" on the motor cover 350. In other words, the fixing protrusion 910 may include the first fixing protrusion 910' and the second fixing protrusion 910". The second fixing protrusion 910" may extend from the motor cover 350.

The second fixing protrusion 910" may extend from the motor cover 350 in a radial direction of the cover shaft hole 358.

The second fixing protrusion 910" may be provided in a plurality. The plurality of second fixing protrusions 910" may be arranged to be spaced apart in the circumferential direction.

The fixing groove 911 provided on the first anti-vibration member 500' may be referred to as a first fixing groove 911'. A second fixing groove 911" may be formed on the second anti-vibration member 500", which is formed to correspond to the second fixing protrusion 910". In other words, the fixing protrusion 910 may include the first fixing protrusion 910' and the second fixing protrusion 910".

The second fixing groove 911" may be formed on the second inclined portion 520" of the second anti-vibration member 500". Accordingly, the second fixing protrusion 910" formed to correspond to the second fixing groove 911" may be formed on the cover inclined portion 352.

The motor cover 350 may include a handle groove 356 that is provided to accommodate the guide handle 570 formed on the second anti-vibration member 500". The handle groove 356 may be formed to correspond to the surface in which the guide handle 570 is accommodated.

With the second fixing protrusion 910" formed on the cover inclined portion 352, visibility may be impaired when the second anti-vibration member 500" and the motor cover 350 are coupled. This is because the view is blocked by the motor cover 350, making it difficult to recognize the exact position where the second fixing protrusion 910" is inserted into the second fixing groove 911". In this case, inserting the guide handle 570 into the handle groove 356 may be easy because the guide handle 570 protrudes outwardly from the motor cover 350, so that the assemblability of the second anti-vibration member 500" and the motor cover 350 may be increased by the guide handle 570 and the handle groove 356.

Furthermore, the cover step portion 353 may be inserted into the second member shaft hole 560", and the cover step portion 353 may be formed to correspond to the shape of the second member shaft hole 560". Accordingly, the second anti-vibration member 500" and the motor cover 350 may be accurately coupled in the left-to-right and up-and-down directions.

The motor cover 350 may include a cover coupling portion 355 formed to correspond to the coupling hole 343 formed on the seat post 340.

It should be understood that the characteristics of the second anti-vibration member 500" described above may also be applied to the first anti-vibration member 500'.

Figure 15:
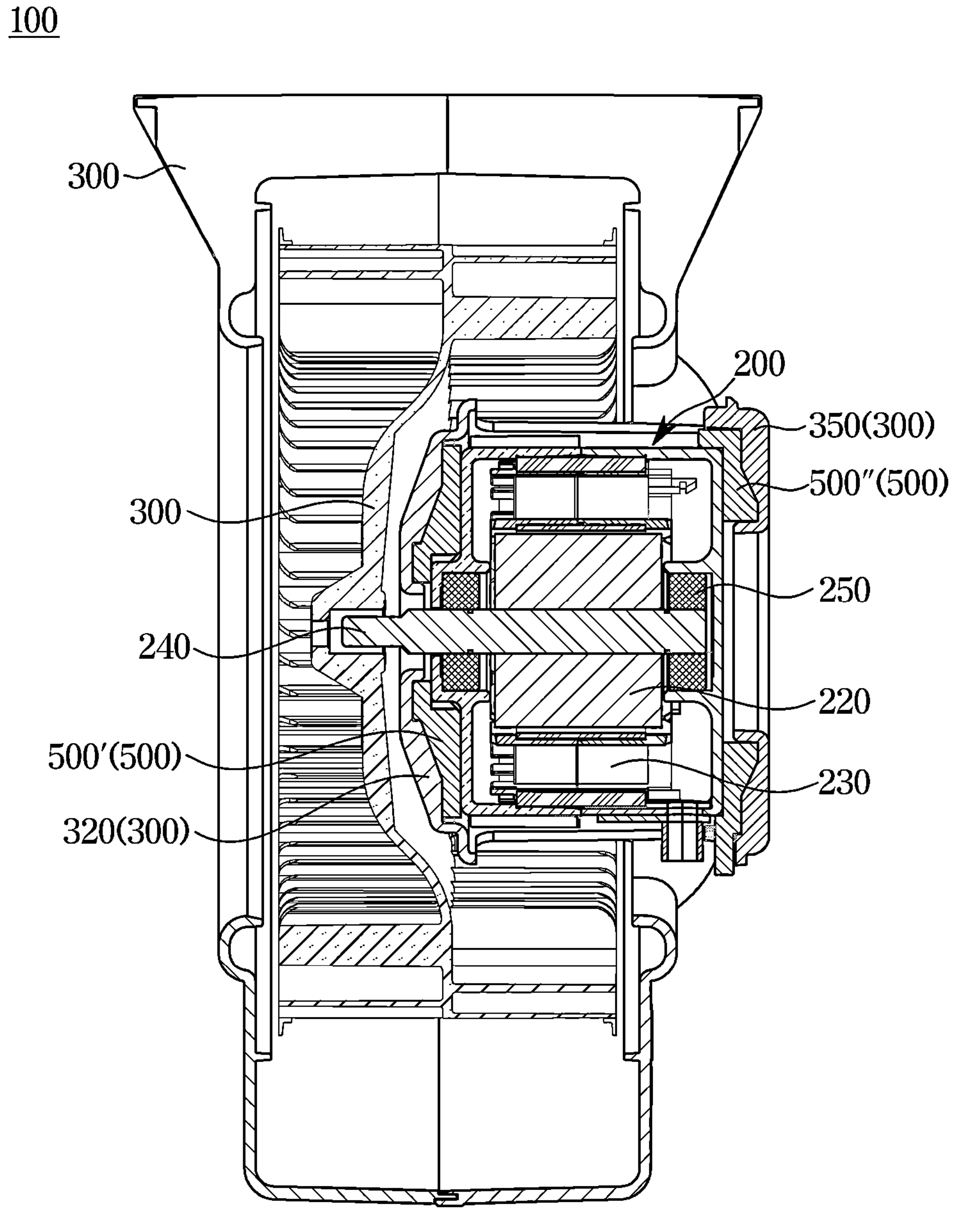
FIG. 15 is a cutaway cross-sectional view of FIG. 3 according to an embodiment of the present disclosure.

FIG. 15 is a cross-sectional cutaway view of FIG. 3.

As shown in FIG. 15, the fan module 100 may include the case 300 including the seated portion 320 and the motor cover 350, the motor 200 coupled to one side of the seated portion 320, the first anti-vibration member 500' positioned between the motor 200 and the seated portion 320, and the second anti-vibration member 500" positioned between the motor 200 and the motor cover 350.

Vibrations may be generated by an attractive force between the stator 230 and the rotor 220 provided within the motor 200.

The vibration generated by the motor 200 may be cancelled by the first anti-vibration member 500' and the second anti-vibration member 500", or may generate only a small amount of noise due to mismatched resonance frequencies.

In addition, the fixer 900 may include the first fixing protrusions 910' and the first fixing grooves 911' positioned between the first anti-vibration member 500' and the seated portion 320. Alternatively, the fixer 900 may include the friction protrusion 950 provided between the first anti-vibration member 500' and the motor 200. Alternatively, the fixer 900 may include the second fixing protrusions 910" and the second fixing grooves 911" provided between the second anti-vibration member 500" and the motor cover 350. Rotation of the motor 200 may be prevented by the fixer 900, thereby preventing vibration caused by rotation of the motor 200.

Furthermore, by preventing the motor 200 from rotating, the lead wire 260 may be prevented from being twisted or damaged.

In addition, the rotating shaft 240 may be supported by a bearing 250 provided within the motor 200.

Figure 16:
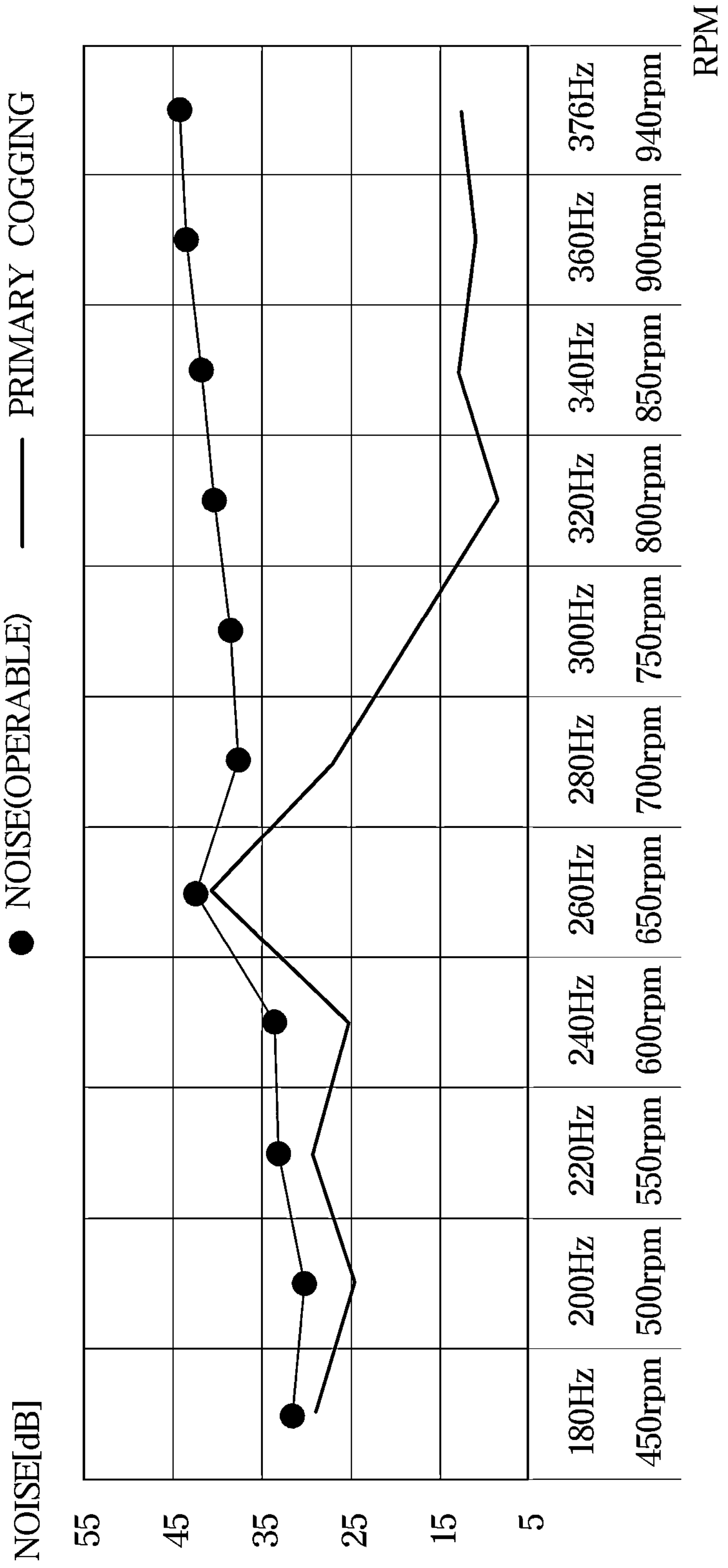
FIG. 16 is a graph showing total noise and cogging noise when the anti-vibration member is not used according to an embodiment of the present disclosure.
Figure 17:
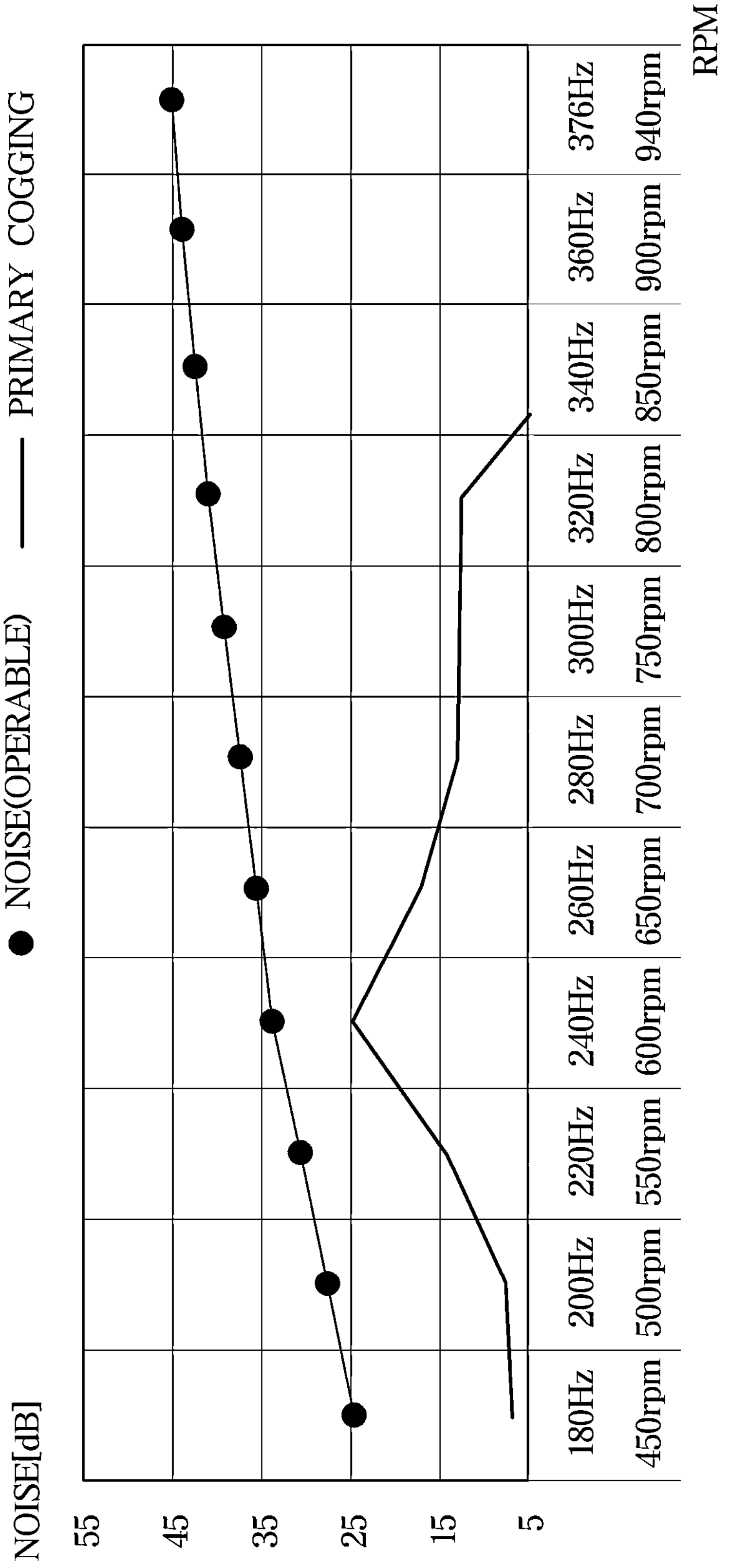
FIG. 17 is a graph showing the total noise and the cogging noise when the anti-vibration member is used according to an embodiment of the present disclosure.

FIG. 16 is a graph showing total noise and cogging noise when the anti-vibration member 500 is not used. FIG. 17 is a graph showing the total noise and the cogging noise when the anti-vibration member 500 is used.

As shown in FIGS. 16 and 17, experiments were conducted to compare the case where the anti-vibration member 500 is not used and the case where the anti-vibration member 500 is used.

The x-axis represents the rotational speed of the motor 200, and the y-axis represents the noise level.

Typically, when the difference between the noise of the entire range hood 1 and the cogging noise is small, the user may complain of discomfort due to the cogging noise. Therefore, for user convenience, it is preferable that the difference between the noise of the whole range hood 1 and the cogging noise be larger.

FIG. 16 is a graph showing the noise when the anti-vibration member 500 is not used.

As shown in FIG. 16, it can be seen that in a low speed range (180 Hz to 260 Hz), the difference between the noise of the entire range hood 1 and the cogging noise is not significant. In particular, in a region where the speed of the motor 200 becomes 260 Hz, it can be seen that the cogging noise and the noise of the entire range hood 1 are almost the same.

FIG. 17 is a graph showing the noise when the anti-vibration member 500 is used.

As shown in FIG. 17, it can be seen that the difference between the noise of the entire range hood 1 and the cogging noise has increased compared to the graph shown in FIG. 16. In particular, in the low speed range, the difference between the noise of the range hood 1 and the cogging noise may be larger than before, and thus the inconvenience caused by the cogging noise may be avoided when the speed of the motor 200 needs to be set low to implement the low noise mode.

Other embodiments of the present disclosure will be described below. In describing other embodiments, it is to be understood that the parts described in the above embodiments may also apply to the parts not described.

In the following, other embodiments of the present disclosure will be described.

Figure 18:
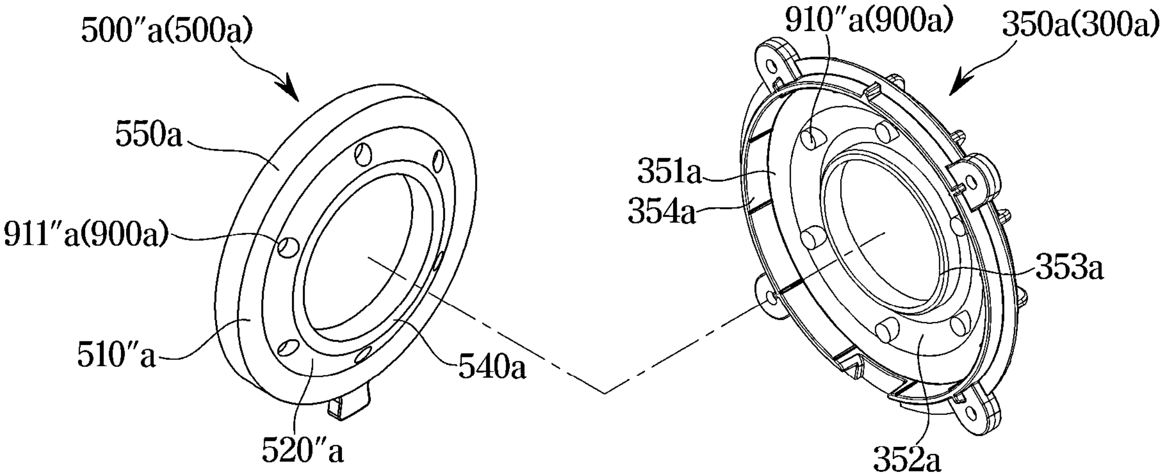
FIG. 18 is an exploded perspective view illustrating an anti-vibration member and a motor cover of a range hood according to an embodiment of the present disclosure.

FIG. 18 is an exploded perspective view showing an anti-vibration member 500*a* and a motor cover 350*a* of a range hood 1*a* according to an embodiment of the present disclosure.

As shown in FIG. 18, a fixer 900*a* may include a second fixing protrusion 910"*a* having the shape of a column and configured to protrude from one side of the motor cover 350*a* toward a second anti-vibration member 500"*a*.

The fixer 900*a* may include a second fixing groove 911"*a* provided to correspond to the second fixing protrusion 910"*a* on the second anti-vibration member 500"*a*.

However, the present disclosure is not limited to the second fixing protrusion 910"*a* being provided on the second anti-vibration member 500"*a* and the second fixing groove 911"*a* being provided on the motor cover 350*a*.

The column-shaped fixing protrusion 910*a* shown in FIG. 18 is not limited to the second fixing protrusion 910"*a*. The first fixing protrusion 910'*a* may be formed in the shape of a column. Accordingly, the second fixing groove 911"*a* may be arranged to correspond to the first fixing protrusion 910'*a*.

Figure 19:
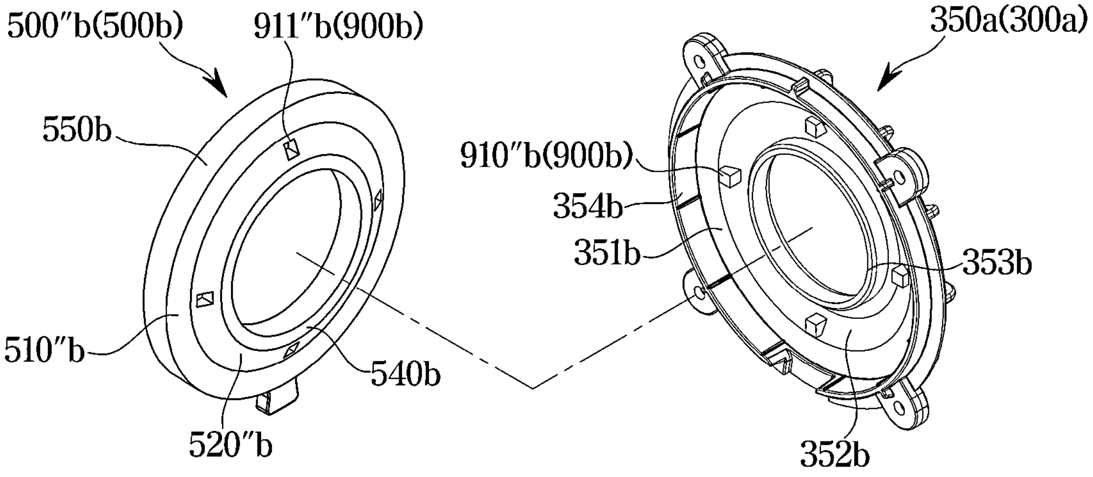
FIG. 19 is an exploded perspective view illustrating an anti-vibration member and a motor cover of a range hood according to an embodiment of the present disclosure.

FIG. 19 is an exploded perspective view showing an anti-vibration member 500*b* and a motor cover 350*b* of a range hood 1*b* according to an embodiment of the present disclosure.

As shown in FIG. 19, a fixer 900*b* may include a second fixing protrusion 910"*b* having the shape of a square column and configured to protrude from one side of the motor cover 350*b* toward a second anti-vibration member 500"*b*.

The fixer 900*b* may include a second fixing groove 911"*b* provided to correspond to the second fixing protrusion 910"*b* on the second anti-vibration member 500"*b*.

However, the present disclosure is not limited to the second fixing protrusion 910"*b* being provided on the second anti-vibration member 500"*b* and the second fixing groove 911"*b* being provided on the motor cover 350*b*.

The square column-shaped fixing protrusion 910*b* shown in FIG. 19 is not limited to the second fixing protrusion. The first fixing protrusion 910'*b* may be formed in the shape of a square column. Accordingly, the second fixing groove 911"*b* may be arranged to correspond to the second fixing protrusion 910"*b*.

Figure 20:
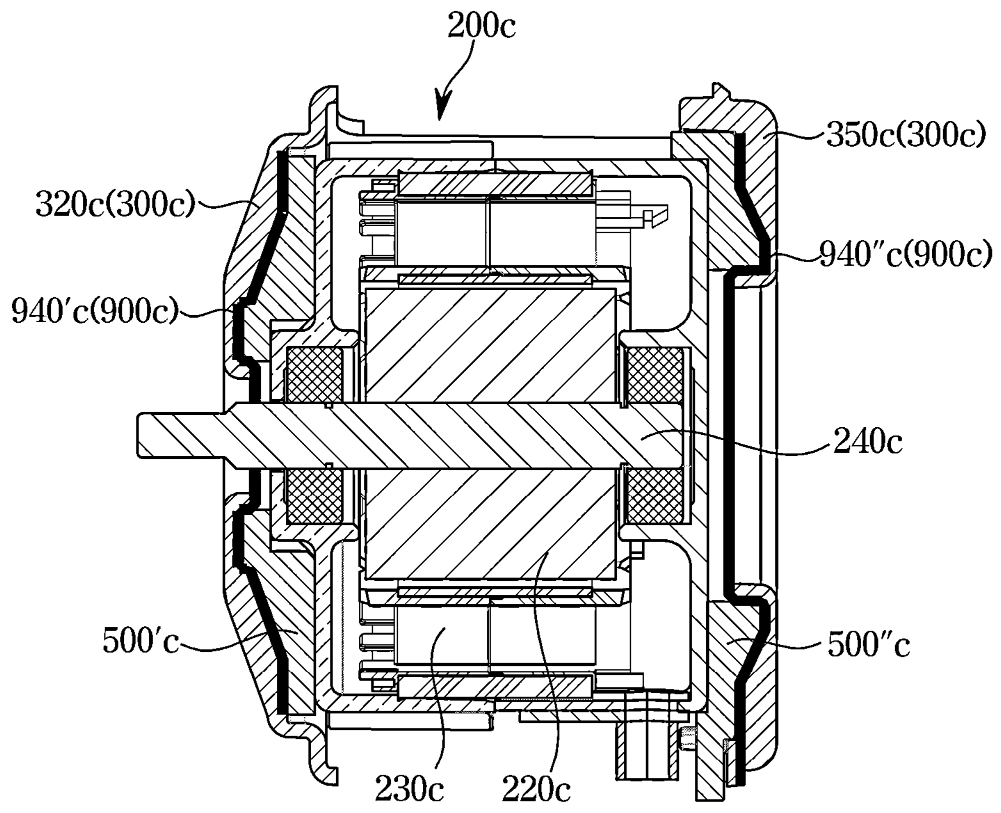
FIG. 20 is a cutaway cross-sectional view illustrating a fan module according to an embodiment of the present disclosure.

FIG. 20 is a cross-sectional cutaway view showing a fan module 100*c* according to an embodiment of the present disclosure.

As shown in FIG. 20, a fixer 900*c* may include an adhesive member 940*c* positioned between a case 300*c* and an anti-vibration member 500*c*. In other words, the fixer 900*c* may include the adhesive member 940*c* arranged to bond the case 300*c* and the anti-vibration member 500*c*.

The adhesive member 940*c* may prevent the anti-vibration member 500*c* from moving relative to the case 300*c* by bonding the case 300*c* and the anti-vibration member 500*c*.

This may prevent the motor 200*c* from moving relative to the case 300*c*.

The adhesive member 940*c* may include a first adhesive member 940*c* positioned between a seated portion 320*c* of the case 300*c* and a first anti-vibration member 500'*c*. The first adhesive member 940*c* may bond the seated portion 320*c* of the case 300*c* and the first anti-vibration member 500'*c*.

The adhesive member 940*c* may include a second adhesive member 940*c* positioned between a motor cover 350*c* and a second anti-vibration member 500"*c*. The second adhesive member 940*c* may bond the motor cover 350*c* and the second anti-vibration member 500"*c*.

The adhesive member 940*c* may include an object with adhesive properties.

Figure 21:
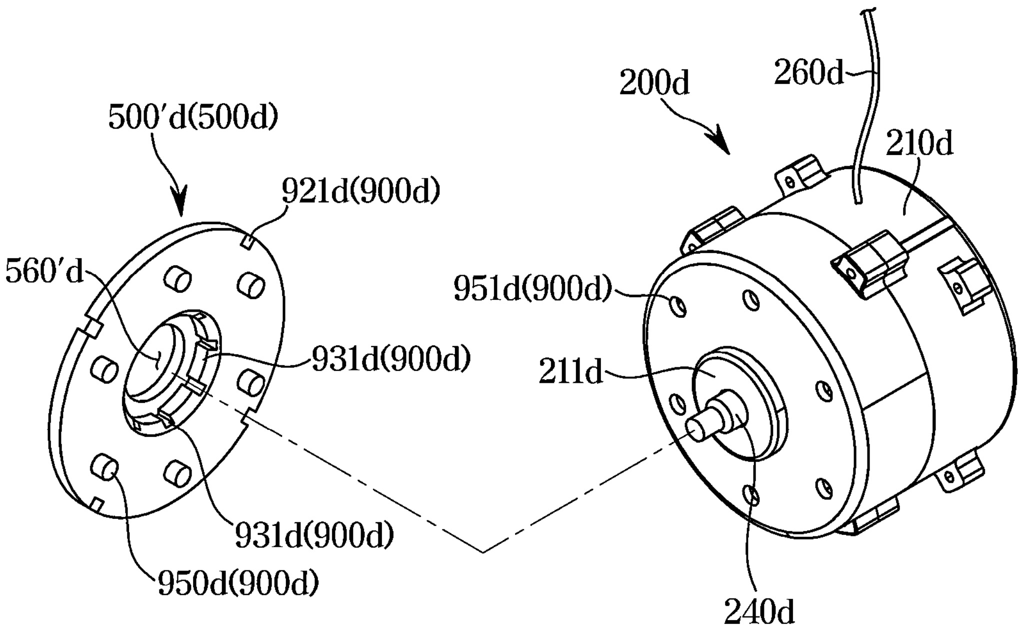
FIG. 21 is an exploded perspective view illustrating an anti-vibration member and a motor disassembled, according to an embodiment of the present disclosure.

FIG. 21 is an exploded perspective view showing an anti-vibration member 500*d* and a motor 200*d* disassembled, according to an embodiment of the present disclosure.

As shown in FIG. 21, a fixer 900*d* may include a friction protrusion 950*d* protruding toward a motor housing 210*d* on the anti-vibration member 500*d*. The fixer 900*d* may include a friction groove 951*d* formed to correspond to the friction protrusion 950*d* on the motor housing 210*d*.

More particularly, the fixer 900*d* may include the friction protrusion 950*d* arranged on a first anti-vibration member 500'*d* and protruding toward the motor 200*d* to prevent relative movement between the first anti-vibration member 500'*d* and the motor 200*d*.

The fixer 900*d* may include a friction groove 951*d* formed on the motor housing 210*d* and provided to correspond to the friction protrusion 950*d*. A position of the friction groove 951*d* may correspond to a position of the friction protrusion 950*d*. The shape of the friction groove 951*d* may correspond to the shape of the friction protrusion 950*d*. The friction protrusion 950*d* may be accommodated in the friction groove 951*d*.

However, the present disclosure may also be applied to the friction protrusion 950*d* being formed on the motor housing 210*d* and the friction groove 951*d* being formed on the first anti-vibration member 500'*d*.

By inserting the friction protrusion 950*d* into the friction groove 951*d*, the first anti-vibration member 500'*d* and the motor housing 210*d* may be coupled together, thereby preventing rotation of the motor housing 210*d*.

FIG. 21 shows that the friction protrusions 950*d* are formed on the first anti-vibration member 500'*d* and the friction grooves 951*d* are formed on the motor housing 210*d*. However, the present disclosure is not limited thereto, and may also be applied to the friction protrusions 950*d* being formed on the second anti-vibration member 500"*d* and the friction grooves 951*d* being formed on the motor housing 210*d*. Furthermore, the present disclosure may be applied to the friction protrusions 950*d* being formed on the motor housing 210*d* and the friction grooves 951*d* being formed on the second anti-vibration member 500"*d*.

In other words, the friction protrusions 950*d* may include a first friction protrusion 950'*d* provided on the first anti-vibration member 500'*d* and a second friction protrusion 950"*d* provided on the second anti-vibration member 500"*d*.

The friction grooves 951*d* may include a second friction groove 951"*d* formed on the surface of the motor housing 210*d* facing the first anti-vibration member 500'*d*, and a second friction groove 951"*d* formed on the surface of the motor housing 210*d* facing the second anti-vibration member 500"*d*.

Figure 22:
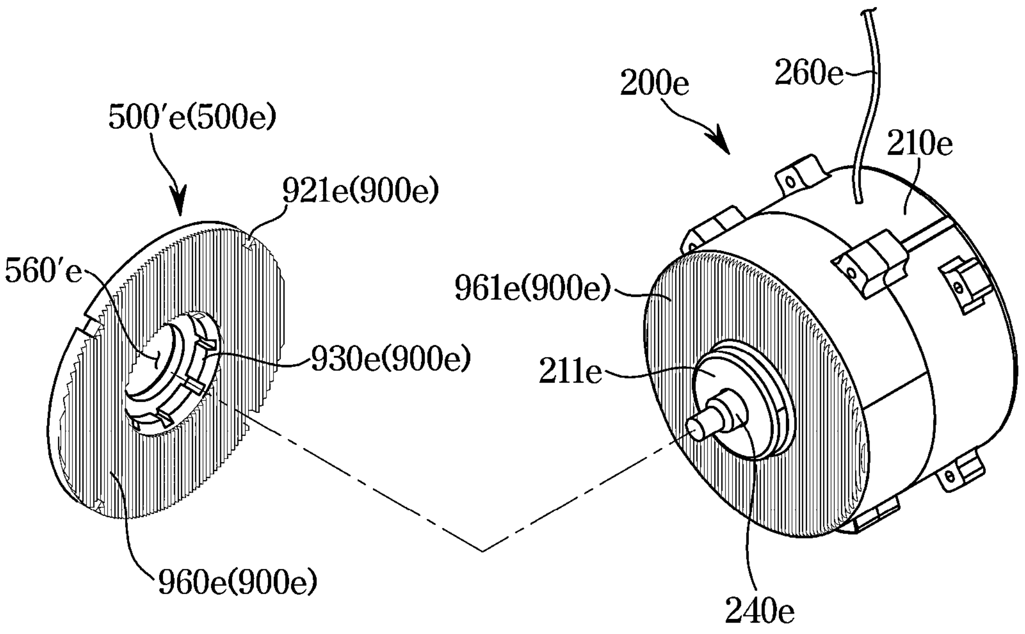
FIG. 22 is an exploded perspective view illustrating an anti-vibration member and a motor disassembled, according to an embodiment of the present disclosure.

FIG. 22 is an exploded perspective view showing an anti-vibration member 500*e* and a motor 200*e*, according to an embodiment of the present disclosure.

As shown in FIG. 22, a fixer 900*e* may include a member friction surface 960*e* formed on the anti-vibration member 500*e* to face a motor housing 210*e*. The fixer 900*e* may include a motor friction surface 961*e* formed on the motor housing 210*e* to correspond to the anti-vibration member 500*e*.

The member friction surface 960*e* may be provided to be uneven.

Alternatively, the friction coefficient of the member friction surface 960*e* may be higher than the friction coefficient of a surface of the anti-vibration member 500*e*.

The motor friction surface 961*e* may be provided to be uneven.

Alternatively, the friction coefficient of the motor friction surface 961*e* may be higher than the friction coefficient of the surface of the anti-vibration member 500*e*.

Accordingly, the anti-vibration member 500*e* and the motor 200*e* may be provided to be relatively motionless.

More particularly, the member friction surface 960*e* may be formed on a first anti-vibration member 500'*e*. The motor friction surface 961*e* may be provided on a surface of the motor housing 210*e* facing the first anti-vibration member 500'*e*.

Alternatively, the member friction surface 960*e* may be formed on a second anti-vibration member 500"*e*. The motor friction surface 961*e* may be provided on a surface of the motor housing 210*e* facing the second anti-vibration member 500"*e*.

The member friction surface 960*e* may be provided on both the first anti-vibration member 500'*e* and the second anti-vibration member 500"*e*.

The motor friction surface 961*e* may be provided on both the surface of the motor housing 210*e* facing the first anti-vibration member 500'*e* and the surface of the motor housing 210*e* facing the second anti-vibration member 500"*e*.

The fixer 900*e* may include the member friction surface 960*e* and may not include the motor friction surface 961*e*.

The fixer 900*e* may include the motor friction surface 961*e* and may not include the member friction surface 960*e*.

The adhesive member 940*c* described with reference to FIG. 21 may be provided between the anti-vibration member 500*e* and the motor 200*e* to prevent movement between the anti-vibration member 500*e* and the motor 200*e*.

Figure 23:
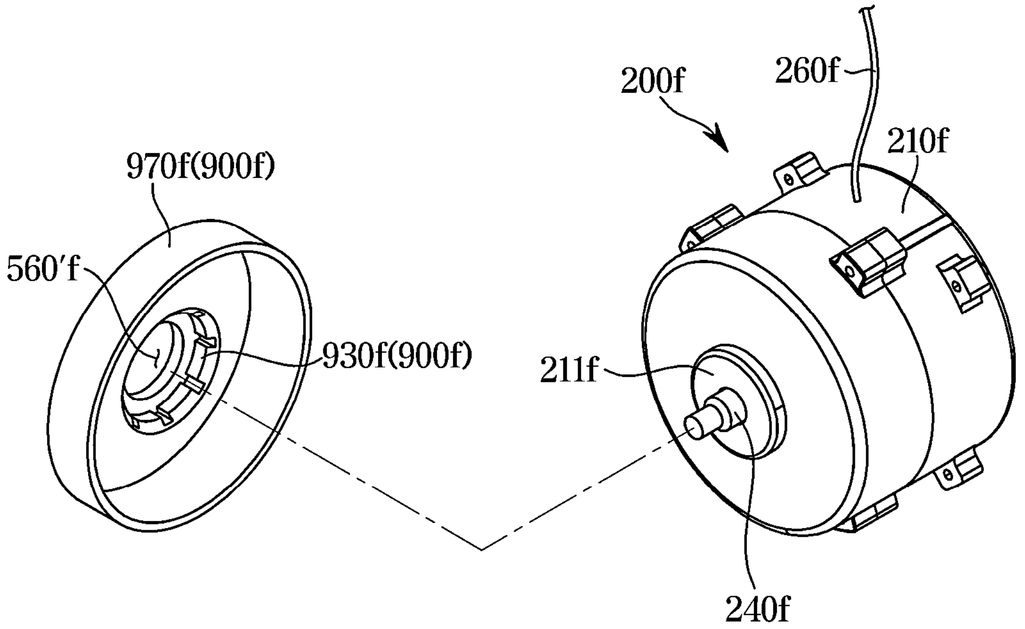
FIG. 23 is an exploded perspective view illustrating an anti-vibration member and a motor disassembled, according to an embodiment of the present disclosure.

FIG. 23 is an exploded perspective view showing an anti-vibration member 500*f* and a motor 200*f*, according to an embodiment of the present disclosure.

As shown in FIG. 23, a fixer 900*f* may include an extension cover 970*f* formed to cover at least a portion of a side of the motor 200*f* at an edge of the anti-vibration member 500*f*.

The extension cover 970*f* may be formed to extend from the anti-vibration member 500*f*.

An inner side of the extension cover 970*f* and a motor housing 210*f* may be in contact. A frictional force between the extension cover 970*f* and the motor housing 210*f* may prevent relative movement of the extension cover 970*f* and the motor housing 210*f*.

The shape of a surface of the anti-vibration member 500*f* facing the motor housing 210*f* may be formed to correspond to the shape of a surface of the motor housing 210*f* facing the anti-vibration member 500*f*.

The motor housing 210*f* may be accommodated in the space formed by the anti-vibration member 500*f* and the extension cover 970*f*.

However, the extension cover 970*f* may also be formed on the motor housing 210*f* and provided to cover at least a portion of the side of the anti-vibration member 500*f*.

More particularly, the fixer 900*f* may include the extension cover 970*f* extending rearwardly from an edge of a first anti-vibration member 500'*f* and covering at least a portion of a side surface of the motor 200*f*.

Alternatively, the fixer 900*f* may include the extension cover 970*f* extending forwardly from an edge of a second anti-vibration member 500"*f* and covering at least a portion of the side surface of the motor 200*f*.

Alternatively, the fixer 900*f* may include the extension cover 970F extending toward each other on the first anti-vibration member 500'*f* and the second anti-vibration member 500"*f* and covering at least a portion of the side of the motor 200*f*.

The adhesive member 940*c* described with reference to FIG. 20 may be provided between the extension cover 970*f* and the motor housing 210*f*.

The friction protrusion 950*d* and the friction groove 951*d* described with reference to FIG. 21 may be provided between the extension cover 970*f* and the motor housing 210*f*.

The member friction surface 960*e* or the motor friction surface 961*e* described with reference to FIG. 22 may be provided between the extension cover 970*f* and the motor housing 210*f*.

Figure 24:
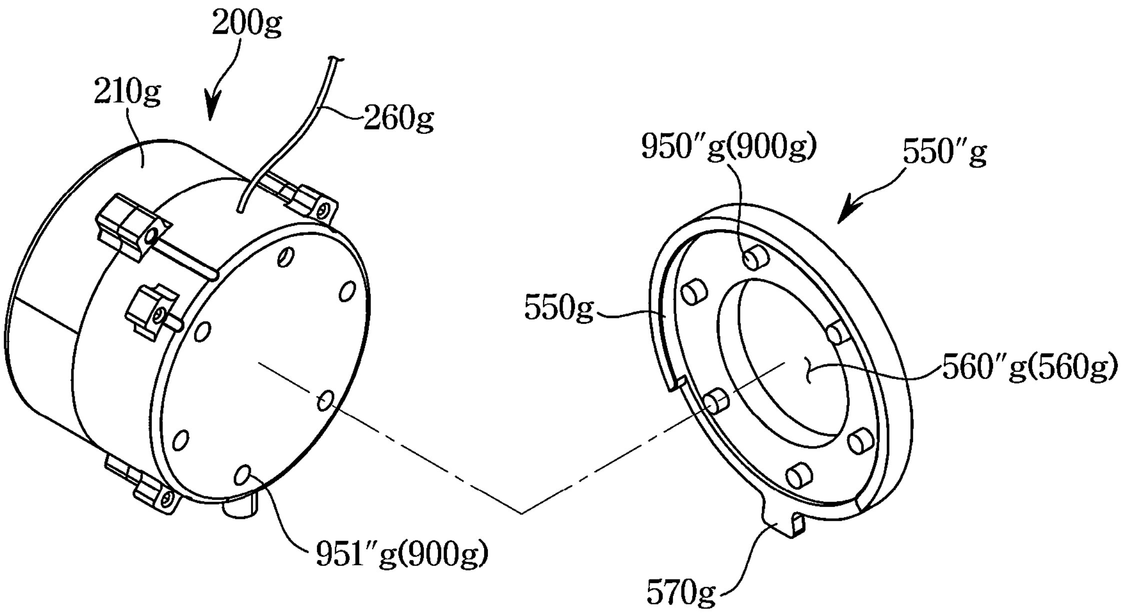
FIG. 24 is an exploded perspective view illustrating an anti-vibration member and a motor disassembled, according to an embodiment of the present disclosure.

FIG. 24 is an exploded perspective view showing a motor 200*g* and an anti-vibration member 500*g*, according to an embodiment of the present disclosure.

As shown in FIG. 24, a fixer 900*g* may include a second friction protrusion 950"*g* formed on a second anti-vibration member 500"*g* and protruding toward a motor housing 210*g*.

The fixer 900*g* may include a second friction groove 951'*g* formed on the motor housing 210*g* and provided to correspond to a second fixing protrusion 910"*g*.

As described above, in the present disclosure, the second friction protrusion 950"*g* may be formed on the motor housing 210*g*, and the second friction groove 951'*g* may be formed on the second anti-vibration member 500"*g*.

According to the embodiment described above, the anti-vibration member 500 may be positioned between the motor 200 and the case 300, thereby reducing noise generated between the motor 200 and the case 300.

The fixer 900 may be arranged to fix the anti-vibration member 500 and at least one of the motor 200 or the case 300, so that the motor 200 may be prevented from rotating.

In other words, the range hood 1 may include the housing 10 having the inlet 20 through which air flows, and the fan module 100 disposed within the housing 10 to draw in air through the inlet 20, wherein the fan module 100 may include the blowing fan 110 configured to flow air, the motor 200 capable of providing a driving force to rotate the blowing fan 110, the case 300 located adjacent to the motor 200, the anti-vibration member 500 in contact with the motor 200 to prevent vibration of the motor 200 from being transmitted to the case 300, and the fixer 900 positioned between the anti-vibration member 500 and at least one of the case 300 or the motor 200 to prevent relative movement between the anti-vibration member 500 and at least one of the case 300 or the motor 200.

At this time, the motor 200 may be configured to rotate in the rotational direction about the rotation shaft, and the fixer 900 may be positioned between the anti-vibration member 500 and the case 300 to prevent the anti-vibration member 500 from moving relatively in the rotational direction of the case 300 and the motor 200.

At this time, the fixer 900 may include the fixing protrusion 910 formed on one of the case 300 and the anti-vibration member 500 and protruding toward the other, and the fixing groove 911 formed on the other of the case 300 and the anti-vibration member 500 and formed to correspond to the fixing protrusion 910.

At this time, the anti-vibration member 500 may include the first side 501 facing the case 300 and the second side 502 opposite to the first side 501 and facing the motor 200, and the fixing groove 911 may be formed on the first side 501.

At this time, the fixing protrusion 910 may be formed on the case 300, and the fixing protrusion 910 may extend in the radial direction of the rotating shaft of the motor 200 and protrude toward the motor 200 as the fixing protrusion approaches to the rotating shaft of the motor.

At this time, the fixing protrusion 910 may be provided in a plurality, and the plurality of fixing protrusions 910 may be arranged to be spaced apart in the circumferential direction around the rotating shaft.

At this time, the fixer 900 may include the guide groove 921 configured to be recessed from the edge of the anti-vibration member 500 to the inner side of the anti-vibration member 500, and the guide protrusion 920 configured to be inserted into the guide groove 921 on the case 300 so as to prevent rotation of the anti-vibration member 500.

At this time, the anti-vibration member 500 may include the flat portion 510 positioned on the edge thereof, and the inclined portion 520 positioned on the inner side of the flat portion 510 and inclined toward the case 300 as it approaches to the rotating shaft of the motor.

At this time, the shape of the surface of the anti-vibration member 500 facing the motor 200 may be formed to correspond to the shape of the surface of the motor 200 facing the anti-vibration member 500.

At this time, the motor 200 may include the rotating shaft 240 and the motor housing 210 including the motor protrusion 211 that is positioned to correspond to the rotating shaft 240 and protrudes toward the case 300, the anti-vibration member 500 may be formed with the member shaft hole 560 through which the rotating shaft 240 passes, and the fixer 900 may include the anti-rotation protrusion 930 configured to surround the member shaft hole 560 and protrude toward the motor protrusion 211 to contact the motor protrusion 211 so as to prevent relative rotation of the case 300 with respect to the anti-vibration member 500 on the anti-vibration member 500.

At this time, the case 300 may further include the seated portion 320 forming the seated space 321 for accommodating at least a portion of the motor 200, the seated portion 320 may include the plurality of seat posts 340 extending toward the motor 200, and the fan module 100 further includes the lead wire 260 positioned between the plurality of seat posts 340 to supply power to the motor 200.

At this time, the case 300 may include the case body 310, the seated portion 320 formed to be recessed to the inside of the case body 310 so as to accommodate the motor 200, and the motor cover 350 coupled to the case body 310 by the fastening member 600 to cover the motor 200, wherein the anti-vibration member 500 may include the first anti-vibration member 500' disposed between the seated portion 320 and the motor 200, and the second anti-vibration member 500" disposed between the motor 200 and the motor cover 350.

At this time, the first anti-vibration member 500' of the anti-vibration member 500 may include the stepped portion 530 protruding toward the seated portion 320, and the seated portion 320 may include the stepped recess 334 formed around the rotation shaft to correspond to the stepped portion 530 in a direction away from the first anti-vibration member 500' so as to guide the stepped portion 530.

At this time, the fixer 900 may include the adhesive member 940 configured to bond the case 300 and the anti-vibration member 500.

At this time, the fixer 900 may include the extension cover 970 formed to cover at least a portion of the side surface of the motor 200 at the edge of the anti-vibration member 500.

The range hood 1 may include the housing 10 having the inlet 20 through which air flows, and the fan module 100 disposed within the housing 10 to draw in air through the inlet 20, wherein the fan module 100 includes a fan configured to flow air by rotating, the motor 200 configured to rotate about a rotating shaft to provide a driving force to rotate the fan, the case 300 including the plurality of seat posts 300 surrounding the seated space 321 recessed forwardly to allow the motor 200 to be seated, the lead wire 260 disposed between the plurality of seat posts 340 and connected to the motor 200, the anti-vibration member 500 in contact with the motor 200 to prevent vibration of the motor 200 from being transmitted to the case 300, and the fixer 900 positioned between the anti-vibration member 500 and at least one of the case 300 or the motor 200 to prevent relative movement between the anti-vibration member 500 and at least one of the case 300 or the motor 200 so as to prevent the lead wire 260 from contacting the plurality of seat posts 340 by rotation of the motor 200.

At this time, the case may include the case body 310, the seated portion 320 configured to be recessed to the inside of the case body 310 so as to accommodate the motor 200, and the motor cover 350 coupled to the case body 310 by the fastening member 600 to cover the motor 200, wherein the anti-vibration member 500 may include the first anti-vibration member 500' disposed between the seated portion 320 and the motor 200, and the second anti-vibration member 500" disposed between the motor 200 and the motor cover 350, wherein the fixer 900 may include the first fixer 900 disposed between the first anti-vibration member 500' and the seated portion 320, and the second fixer 900 disposed between the second anti-vibration member 500" and the motor cover 350.

At this time, the first fixer 900 may include the first fixing protrusion 910' formed on the seated portion 320 and protruding toward the first anti-vibration member 500' and a first fixing groove 911' formed on the first anti-vibration member 500' and concave in a direction away from the seated portion 320, and the second fixer 900' may include the second fixing protrusion 910" formed on the motor cover 350 and protruding toward the second anti-vibration member 500" and the second fixing groove 911" formed on the second anti-vibration member 500" and concave in a direction away from the motor cover 350.

The fan module 100 may include a fan configured to flow air by rotating, the motor 200 configured to rotate about a rotating shaft in a rotational direction to provide a driving force to rotate the fan, the lead wire 260 connected to the motor 200 for supplying power to the motor 200, the case 300 located adjacent to the motor 200, the anti-vibration member 500 in contact with the motor 200 and the case 300 to prevent vibration of the motor 200 from being transmitted to the case 300, and the fixer 900 positioned between the anti-vibration member 500 and the case 300 to prevent relative movement in the rotational direction of the anti-vibration member 500 and the case 300.

At this time, the fixer 900 may include the fixing protrusion 910 formed on one of the case 300 and the anti-vibration member 500 and protruding toward the other, and the fixing groove 911 formed on the other of the case 300 and the anti-vibration member 500 and formed to correspond to the fixing protrusion 910.

The embodiments described above may be combined and implemented unless they are arranged together.

While the present disclosure has been particularly described with reference to exemplary embodiments, it should be understood by those of skilled in the art that various changes in form and details may be made without departing from the spirit and scope of the present disclosure.

What is claimed is:

1. A range hood, comprising:

a housing having an inlet through which air flows; and a fan module, arrangeable within the housing, to draw in air through the inlet of the housing;

wherein the fan module comprises:

a fan configured to guide the air drawn in through the inlet, a motor to provide a driving force to rotate the fan, a case arrangeable adjacent to the motor, an anti-vibration member in contact with the motor to prevent vibration of the motor from being transmitted to the case while the motor provides the driving force to the fan and the case is arranged adjacent to the motor, and a fixer coupleable to the anti-vibration member along a radial direction of a rotating shaft of the motor, while the fixer is positioned between the anti-vibration member and at least one of the case or the motor, to prevent movement between the anti-vibration member and the at least one of the case or the motor, wherein the fixer comprises:

a fixing protrusion, on one of the case and the anti-vibration member, protruding toward another of one of the case and the anti-vibration member, and a fixing groove, on the other of the case and the anti-vibration member, to correspond to the fixing protrusion.

2. The range hood of claim 1, wherein the motor is configured to rotate in a rotational direction about the rotating shaft, and the fixer is positioned between the anti-vibration member and the case to prevent the anti-vibration member from moving relative to the rotational direction.

3. The range hood of claim 1, wherein the anti-vibration member includes a first side facing the case and a second side, opposite to the first side, facing the motor, and the fixing groove is on the first side.

4. The range hood of claim 1, wherein the fixing protrusion is configured to protrude from one surface of the case toward the anti-vibration member, extend along the radial direction with respect to the rotating shaft of the motor, and further protrude from the one surface of the case closer to the rotating shaft of the motor.

5. The range hood of claim 1, wherein the fixing protrusion is among a plurality of fixing protrusions, and the plurality of fixing protrusions are arranged to be spaced apart along a circumferential direction around the rotating shaft.

6. The range hood of claim 2, wherein the fixer comprises:

a guide groove configured to be recessed from an edge of the anti-vibration member to an inner side of the anti-vibration member, and a guide protrusion configured to be inserted into the guide groove on the case so as to prevent rotation of the anti-vibration member.

7. The range hood of claim 3, wherein the anti-vibration member comprises:

a flat portion positioned on an edge thereof, and an inclined portion, positioned on an inner side of the flat portion, and inclined toward the case closer to the rotating shaft of the motor.

8. The range hood of claim 7, wherein a shape of a surface of the anti-vibration member facing the motor is formed to correspond to a shape of a surface of the motor facing the anti-vibration member.

9. The range hood of claim 7, wherein the motor includes a motor housing including a motor protrusion that is positioned to correspond to the rotating shaft and protrudes toward the case, the anti-vibration member is formed with a member shaft hole through which the rotating shaft passes, and the fixer includes an anti-rotation protrusion configured to surround the member shaft hole and protrude toward the motor protrusion to contact the motor protrusion so as to prevent relative rotation of the case with respect to the anti-vibration member on the anti-vibration member.

10. The range hood of claim 2, wherein the case further includes a seated portion forming a seated space for accommodating at least a portion of the motor, the seated portion includes a plurality of seat posts extending toward the motor, and the fan module further includes a lead wire positioned between the plurality of seat posts to supply power to the motor.

11. The range hood of claim 2, wherein the case comprises:

a case body, a seated portion configured to be recessed to an inside of the case body so as to accommodate the motor, and a motor cover coupleable to the case body by a fastening member to cover the motor, wherein the anti-vibration member comprises:

a first anti-vibration member between the seated portion and the motor, and a second anti-vibration member between the motor and the motor cover.

12. The range hood of claim 11, wherein the first anti-vibration member includes a stepped portion protruding toward the seated portion, the seated portion includes a stepped recess formed to correspond to the stepped portion along a direction away from the first anti-vibration member around the rotating shaft so as to guide the stepped portion.

13. The range hood of claim 1, wherein the fixer includes an adhesive member configured to bond the case and the anti-vibration member.

14. The range hood of claim 1, wherein the fixer includes an extension cover formed to cover at least a portion of a side surface of the motor at an edge of the anti-vibration member.

* * * * *